US008538861B2

(12) United States Patent  (10) Patent No.: US 8,538,861 B2
Auerbach  (45) Date of Patent: *Sep. 17, 2013

(54) USE OF ADAPTIVE AND/OR CUSTOMIZED COMPRESSION TO ENHANCE THE EFFICIENCY OF DIGITAL FINANCIAL DATA EXCHANGES

(71) Applicant: Auerbach Group LLC, New York, NY (US)

(72) Inventor: Andrew Auerbach, Rockville, MD (US)

(73) Assignee: Auerbach Group LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,179

(22) Filed: Oct. 11, 2012

(65) Prior Publication Data

US 2013/0066762 A1  Mar. 14, 2013

Related U.S. Application Data

(63) Continuation of application No. 12/762,324, filed on Apr. 17, 2010, now Pat. No. 8,321,326.

(60) Provisional application No. 61/252,133, filed on Oct. 15, 2009, provisional application No. 61/242,773, filed on Sep. 15, 2009.

(51) Int. Cl.
*G06Q 40/00* (2012.01)

(52) U.S. Cl.
USPC .............................. 705/37; 705/36 R; 705/35

(58) Field of Classification Search
USPC .............................................. 705/37; 301/87
See application file for complete search history.

(56) References Cited

U.S. PATENT DOCUMENTS

| 4,122,440 A | 10/1978 | Langdon |
| 4,286,256 A | 8/1981 | Langdon |
| 4,386,416 A | 5/1983 | Giltner et al. |
| 4,467,317 A | 8/1984 | Langdon |

(Continued)

FOREIGN PATENT DOCUMENTS

| CA | 2151023 | 12/1995 |
| EP | 0687111 A2 | 6/1995 |

(Continued)

OTHER PUBLICATIONS

Anonymous (Jul. 10, 2010) "Deutsche Börse: Preparations for New IT Infrastructure—Two New Standardized Interfaces To Be Launched In 2011," MondoVisione Article (http://www.mondovisione.com/index.cfm?section=news&action=detail&id=92631 Oct. 12, 2010) (1 page).
Anonymous (Sep. 7, 2010) "Deutsche Börse treibt Entwicklung der globalen Handelsplattform voran (AF)," swissinfo.ch Article (German) (2pages).
Anonymous (Sep. 7, 2010) "German Stock Market Is Driving Development Of The Global Trading platform (AF)" Google Translation of "Deutsche Börse treibt Entwicklung der globalen Handelsplattform voran (AF)," swissinfo.ch Article (German) (2pages).

(Continued)

*Primary Examiner* — James A Vezeris
(74) *Attorney, Agent, or Firm* — Jeffrey I. Auerbach; The Auerbach Law Firm, LLC

(57) ABSTRACT

The present invention relates to a method for enhancing the efficiency of digitally communicated data exchanges and to a computer system that implements such a method. The invention particularly concerns the use of adaptive custom compression techniques, binary integers ("bits"), massively parallel processing, database optimization techniques and/or calculation optimization techniques to achieve such enhanced efficiency. The invention is applicable to any digitally communicated data exchange, but is particularly applicable to exchanges of financial information such as financial market buy/sell orders, market making, etc.

15 Claims, 8 Drawing Sheets

(56) References Cited

U.S. PATENT DOCUMENTS

| | | | |
|---|---|---|---|
| 4,652,856 A | 3/1987 | Mohiuddin et al. | |
| 4,745,559 A | 5/1988 | Willis et al. | |
| 4,750,135 A | 6/1988 | Boilen | |
| 4,891,643 A | 1/1990 | Mitchell et al. | |
| 4,905,297 A | 2/1990 | Langdon, Jr. et al. | |
| 4,933,883 A | 6/1990 | Pennebaker et al. | |
| 4,935,882 A | 6/1990 | Pennebaker et al. | |
| 4,989,000 A | 1/1991 | Chevion et al. | |
| 5,099,440 A | 3/1992 | Pennebaker et al. | |
| 5,230,073 A | 7/1993 | Gausmann et al. | |
| 5,272,478 A | 12/1993 | Allen | |
| 5,404,488 A | 4/1995 | Kerrigan et al. | |
| 5,796,356 A | 8/1998 | Okada et al. | |
| 5,801,648 A | 9/1998 | Satoh et al. | |
| 5,815,556 A | 9/1998 | Thuresson et al. | |
| 5,844,508 A | 12/1998 | Murashita et al. | |
| 5,867,114 A | 2/1999 | Barbir | |
| 5,907,637 A | 5/1999 | Murashita et al. | |
| 6,006,206 A | 12/1999 | Smith et al. | |
| 6,026,198 A | 2/2000 | Okada | |
| 6,061,398 A | 5/2000 | Satoh et al. | |
| 6,215,422 B1 | 4/2001 | Henry et al. | |
| 6,271,689 B1 | 8/2001 | Freking et al. | |
| 6,271,775 B1 | 8/2001 | Jaquette et al. | |
| 6,292,114 B1 | 9/2001 | Tsai et al. | |
| 6,304,197 B1 | 10/2001 | Freking et al. | |
| 6,518,895 B1 | 2/2003 | Weiss et al. | |
| 7,064,489 B2 | 6/2006 | Price | |
| 7,095,343 B2 | 8/2006 | Xie et al. | |
| 7,106,794 B2 | 9/2006 | Ungerboeck et al. | |
| 7,129,864 B2 | 10/2006 | Jahanghir et al. | |
| 7,190,287 B2 | 3/2007 | Acharya et al. | |
| 7,200,595 B2 | 4/2007 | Dutta et al. | |
| 7,206,644 B2 | 4/2007 | Iino et al. | |
| 7,213,012 B2 | 5/2007 | Jakobsson et al. | |
| 7,233,939 B1 | 6/2007 | Ziauddin | |
| 7,254,273 B2 | 8/2007 | Sakanashi et al. | |
| 7,281,000 B2 | 10/2007 | Kapoor et al. | |
| 7,283,591 B2 | 10/2007 | Ruehle | |
| 7,304,999 B2 | 12/2007 | Sukonik et al. | |
| 7,321,897 B2 | 1/2008 | Ondrusek et al. | |
| 7,333,037 B2 | 2/2008 | Cheng | |
| 7,358,870 B2 | 4/2008 | Bay | |
| 7,359,926 B1 | 4/2008 | Yohe | |
| 7,365,658 B2 | 4/2008 | Todorov et al. | |
| 7,375,660 B1 | 5/2008 | Chang et al. | |
| 7,404,015 B2 | 7/2008 | Zemach et al. | |
| 7,417,568 B2 * | 8/2008 | Fallon et al. | 341/51 |
| 7,430,562 B1 | 9/2008 | Bedell et al. | |
| 7,443,321 B1 * | 10/2008 | Kaufman et al. | 341/87 |
| 7,444,385 B2 | 10/2008 | Blumrich et al. | |
| 7,454,749 B2 | 11/2008 | Oberdorfer | |
| 7,460,595 B2 | 12/2008 | Ungerboeck et al. | |
| 7,478,278 B2 | 1/2009 | Archer et al. | |
| 7,512,591 B2 | 3/2009 | Bildhaeuser et al. | |
| 7,519,582 B2 | 4/2009 | Fagin et al. | |
| 7,523,130 B1 | 4/2009 | Meadway et al. | |
| 7,538,696 B2 | 5/2009 | Laker et al. | |
| 7,552,110 B2 | 6/2009 | Hrle et al. | |
| 7,555,566 B2 | 6/2009 | Blumrich et al. | |
| 7,564,379 B2 | 7/2009 | Ruehle | |
| 7,565,313 B2 | 7/2009 | Waelbroeck et al. | |
| 7,571,397 B2 | 8/2009 | Hanson et al. | |
| 7,574,424 B2 | 8/2009 | Chowdhuri | |
| 7,580,854 B2 | 8/2009 | Carter et al. | |
| 7,605,721 B2 | 10/2009 | Schneider | |
| 7,716,119 B2 | 5/2010 | Cha | |
| 8,321,326 B2 | 11/2012 | Auerbach | |
| 2003/0179114 A1 | 9/2003 | Kampf | |
| 2004/0030632 A1 | 2/2004 | Hausman | |
| 2004/0064420 A1 | 4/2004 | Buist | |
| 2005/0197916 A1 | 9/2005 | Newell et al. | |
| 2007/0118455 A1 | 5/2007 | Albert et al. | |
| 2007/0233477 A1 | 10/2007 | Halowani et al. | |
| 2008/0004896 A1 | 1/2008 | Gover | |
| 2008/0154756 A1 | 6/2008 | Deudney | |
| 2009/0144381 A1 | 6/2009 | Li | |

FOREIGN PATENT DOCUMENTS

| | | |
|---|---|---|
| EP | 1223677 A2 | 7/2002 |
| EP | 1501258 A1 | 1/2005 |
| WO | WO 81/03560 A1 | 12/1981 |
| WO | WO 97/35383 A1 | 9/1997 |
| WO | WO 97/35427 A1 | 9/1997 |
| WO | WO 02/27644 A1 | 4/2002 |
| WO | WO 02/39293 A1 | 5/2002 |
| WO | WO 02/39355 A1 | 5/2002 |
| WO | WO 02/43326 A1 | 5/2002 |
| WO | WO 02/060067 A2 | 8/2002 |
| WO | WO 2006/005151 A1 | 1/2006 |
| WO | WO 2011/034667 A1 | 3/2011 |

OTHER PUBLICATIONS

Bookstein, A. et al. (1991) "*Flexible Compression for Bitmap Sets,*" In: IEEE Data Compression Conference, pp. 402-410.

Connell, J.B. (1973) "*A Huffman-Shannon-Fano Code,*" Proc. of the IEEE, Jul. 1973 1046-1047.

Hashemian, R. (1993) "*High Speed Search and Memory Efficient Huffman Coding,*" IEEE International Symposium on Circuits and Systems, ISCAS '93, vol. 1, pp. 287-290.

Hashemian, R. (1994) "*Design and Hardware Implementation of a Memory Efficient Huffman Decoding,*" IEEE Transactions on Consumer Electronics, vol. 40(3):345-352.

Hashemian, R. (1995) "*Memory Efficient and High-Speed Search Huffman Coding,*" IEEE Transactions on Communications, 43(10):2576-2581.

Hashemian, R. et al. (2001) "*Reduced Code Transmission and High Speed Reconstruction Of Huffman Tables,*" Pacific Rim Conference on Communications, Computers and Signal Processing, vol. 1, pp. 180-183.

Hashemian, R. (2002) "*Condensed Huffman Coding, a New Efficient Decoding Technique,*" The 2002 45$^{th}$ Midwest Symposium on Circuits and Systems, vol. 1, pp. 228-231.

Hashemian, R. (2003) "*Direct Huffman Coding and Decoding using the Table of Code-Lengths,*" Proceedings ITCC 2003, International Conference on Information Technology: Coding and Computing, pp. 237-241.

Hashemian, R. (2004) "*Condensed Table of Huffman Coding, a New Approach to Efficient Decoding,*" IEEE Transactions on Communications, 52(1):6-8.

Houstoun, K. (2006) "*FIX Adapted for Streaming—FAST(sm) Protocol Technical Overview,*" http://www.fixprotocol.org/documents/2801/FIX%20Adapted%20for%20STreaming%20-%20FAST%20Protocol.pdf.

Huffman, D.A. (1952) "*A Method for the Construction of Minimum-Redundancy Codes,*" Proc. I.R.E., September, pp. 1098-1102.

International Search Report and Written Opinion, PCT/US2010/044587 (Oct 7, 2010) (11 pages).

Lekatsas, H. et al. (1998) "*Code Compression for Embedded Systems,*" 35$^{th}$ Design Automation Conference (pp. 1-6).

Notification Concerning International Preliminary Report on Patentability, PCT/US2010/044587 (Mar. 20, 2010) (7 pages).

Nourani, M. et al. (2005) "*RL-Huffman Encoding for Test Compression and Power Reduction in Scan Applications,*" ACM Transactions on Design Automation of Electronic Systems, 10(1):91-115.

Shannon, C. (1949) "*A Mathematical Theory of Communication,*" In: "The Mathematical Theory of Communication," Shannon, C. et al., The University of Illinois Press, Urbana, IL, pp. 1-54.

Xie et al. (2002) "*Code Compression for VLIW Processors Using Variable-To-Fixed Coding,*" 15$^{th}$ International Symposium on System Synthesis, 2002 (pp. 138-143).

\* cited by examiner

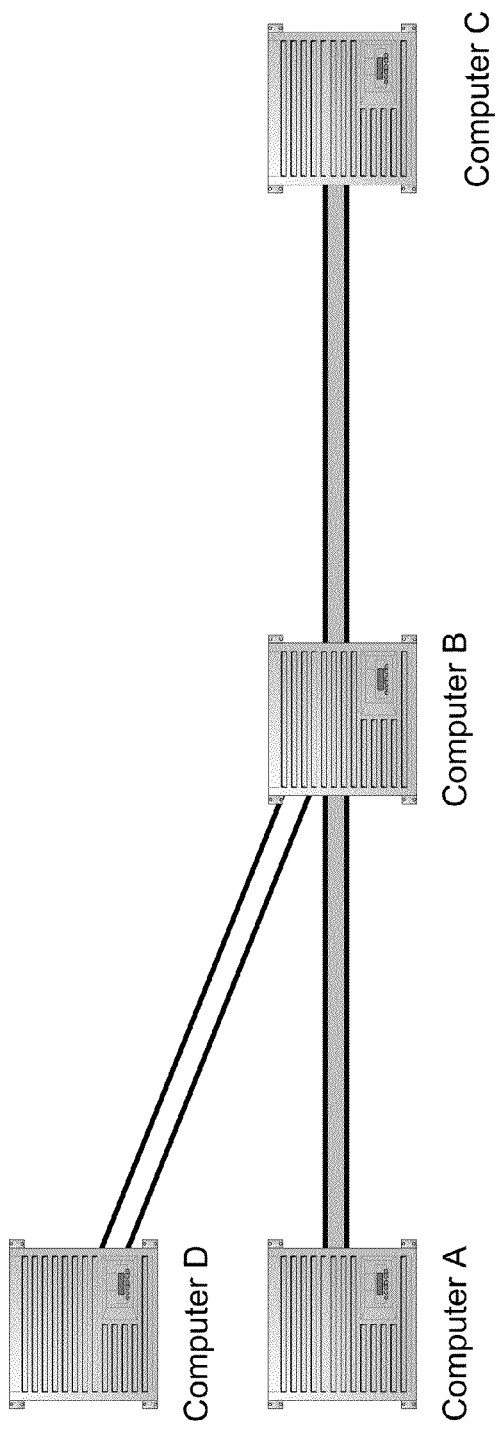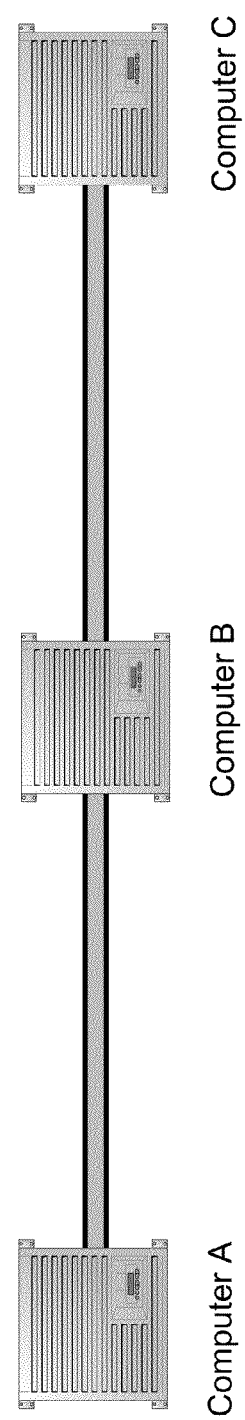
Figure 4A
Figure 4B

USE OF ADAPTIVE AND/OR CUSTOMIZED COMPRESSION TO ENHANCE THE EFFICIENCY OF DIGITAL FINANCIAL DATA EXCHANGES

CROSS-REFERENCE TO RELATED APPLICATIONS

This application claims priority to U.S. patent application Ser. Nos. 12/762,324 (filed Apr. 17, 2010; pending), 61/252,133 (filed Oct. 15, 2009; expired) and 61/242,773 (filed Sep. 15, 2009; expired), each of which applications is herein incorporated by reference in its entirety.

BACKGROUND OF THE INVENTION

1. Field of the Invention

The present invention relates to a method for enhancing the efficiency of digitally communicated data exchanges and to a computer system that implements such a method. The invention particularly concerns the use of adaptive custom compression techniques, binary integers ("bits"), massively parallel processing, database optimization techniques and/or calculation optimization techniques to achieve such enhanced efficiency. The invention is applicable to any digitally communicated data exchange, but is particularly applicable to exchanges of financial information such as financial market buy/sell orders, market making, etc.

2. Description of Related Art

Historically, the trading of financial interests has been conducted on the floors of Market Exchanges or auction forums, whereby numbers of active participants concurrently bid to buy and offer to sell a particular stock, commodity, other security, or other asset. In recent years, however, the volume of transactions has dramatically increased, and the need to communicate and complete such transactions as quickly as possible has led to the development of computer systems designed to replace actual trading floors or auction forums (United States Patent Publication No. 2003/0126068). The fluid functioning of modern, high volume, rapid turnaround electronic Market Exchanges (e.g., Archipelago Exchange (ARCA), BATS Exchange, Chicago Mercantile Exchange, Eurex, International Stock Exchange, NASDAQ, New York Stock Exchange (NYSE), Dark Pools, and Electronic Communications Networks (ECNs), etc.) requires a highly efficient exchange of financial information between involved parties (e.g., buyers, Brokers, sellers, etc.).

Financial information is, however, currently communicated with sub-optimal efficiency. Systems and methods for processing and transferring data using data communications networks are shown in U.S. Pat. Nos. 4,745,559; 4,750,135; 5,230,073; 5,404,488; 5,815,556; and 6,006,206; and in United States Patent Publications Nos. 2003/0126058 and US 2005/0197916; and European Patent Application EP 1501258A1, and in PCT Publication Nos. WO 02/39293A1; WO 02/39355A1; and WO 02/43326A1. The most widespread method of communicating financial information is the Financial Information Exchange ("FIX") Protocol (United States Patent Publications Nos. 2009/0144381; 2008/0154756; 2008/0004896; 2004/0064420; and 2004/0030632), and its variants (such as FIX Adapted for STreaming (FAST$^{SM}$); see, e.g., Houstoun, K. (2006) "FIX Adapted for Streaming—FAST$^{SM}$ Protocol Technical Overview," Fix Protocol, Ltd., fixprotocol.org). Although the FIX Protocol is an improvement over prior financial communication technologies it remains in many ways inadequately suited to evolving market volumes and transaction needs. The typical scenario that FIX was designed to address involves two parties to a financial transaction setting up a point-to-point communications link in order to exchange messages formatted according to a FIX protocol. This approach has led to multiple problems. One problem reflects the establishment of numerous point-to-point communications links between the various members of the financial trading community, which can lead to an intractable mesh of communication links and nodes. Additionally, the evolution of the FIX protocol has resulted in the creation of numerous variants that are only loosely related to and sometimes incompatible with one another. As a result, members of the financial trading community find themselves not only having to support a myriad of point-to-point communication links, but also having to support numerous protocol variants on such links. Consequently, any efficiency gains arising from the ability to exchange financial-transaction-related messages electronically can quickly become eroded by the complexity of the requisite supporting IT infrastructure (United States Patent Publication No. 2008/0154756).

Thus, despite all prior advances, a need remains for a method capable of enhancing the efficiency of digitally communicated data exchanges. The present invention is directed to this and other goals, particularly as achieved using an enhancement strategy that involves compression (custom, adaptive or adaptive custom), binary integers ("bits") as the native language of some or all of the system, massively parallel processing, database optimization, and/or calculation optimization.

SUMMARY OF THE INVENTION

Previously employed systems and methods of communicating financial information communicate unnecessary data, and thus necessarily decrease the capacity of financial networks to process data, extract the conveyed information, and slow the rate of processing of individual data exchanges. In order for data to be processed by a computer, the data must ultimately be reduced into a binary language form. Typically, a computer will then transmit the data by having a modem device convert the digital binary data into analog signals that represent the binary data. The recipient computer system then uses its modem to demodulate the analog signal back into digital binary data. The FIX Protocol uses American Standard Code for Information Interchange (ASCII) to encode information from English into binary. With the FIX Protocol, financial information is therefore converted into fixed length blocks containing 8 bits per character (or 7 bits per character if one does not use a parity bit). These bits are then transmitted as a concatenated string of binary integers (bits). Unfortunately, the ASCII coding scheme was designed to serve as a common coding scheme for general English language communications, and is not optimally suited for transmissions of financial information.

The present invention relates to a method for enhancing the efficiency of digitally communicated data exchanges and to a computer system that implements such a method. The invention particularly concerns the use of adaptive custom compression techniques, binary integers ("bits"), massively parallel processing, database optimization techniques and/or calculation optimization techniques to achieve such enhanced efficiency. The invention is applicable to any digitally communicated data exchange, but is particularly applicable to exchanges of financial information such as financial market buy/sell orders, market making, etc.

In detail, the invention provides a computer-implemented method for enhancing the efficiency of digitally communicating a financial message from a first computer to a second computer, which method comprises the steps:
  (A) employing a data compression technique to establish a coding scheme and employing the coding scheme to produce a database that enables:
    (1) the formation of an encoded version of an unencoded financial message based on order-units present in the unencoded financial message; and
    (2) the decoding of the unencoded version of the financial message; wherein the message length of the encoded version of the financial message is shorter than the message length of the unencoded financial message;
  (B) providing the database to the first and second computers; and
  (C) digitally communicating the encoded version of the financial message from the first computer to the second computer, directly or via one or more intermediate computers.

The invention further concerns the embodiment(s) of such computer-implemented method, wherein the data compression technique additionally employs massively parallel processing; and/or wherein the data compression technique additionally employs a database optimization technique, and/or wherein the data compression technique additionally employs a calculation optimization technique.

There are no limitations on the relationship between the first and second computers involved in such communication. The invention further concerns the embodiments of such computer-implemented methods, wherein the first computer is a Client Computer and the second computer is a Broker Computer in digital communication with the Market Exchange; or wherein the first computer is a Broker Computer and the second computer is a Market Exchange Computer. The invention further concerns the embodiment of such computer-implemented methods, wherein the first computer is a Gateway Computer of a Broker Computer and the second computer is a Risk Management System Computer of a Broker Computer; or wherein the first computer is a Gateway Computer of a Market Exchange and the second computer is a Matching Engine Computer of a Market Exchange Computer. The invention further concerns the embodiment of such computer-implemented methods, wherein the financial message is executed at the Market Exchange.

The invention further concerns the embodiment of such computer-implemented methods, wherein the data compression technique is customized to encode the financial message into an encoded version having at least 80% efficiency, or wherein the data compression technique is customized to encode the financial message into an encoded version having at least 90% efficiency.

The invention further concerns the embodiment of such computer-implemented methods, wherein the data compression technique is customized to encode the financial message into a message that is at least 50% shorter than a message communicating the unencoded financial message.

The invention further concerns the embodiment of such computer-implemented methods, wherein the data compression technique is customized to encode the financial message into a message that is at least 5-fold shorter than a message communicating the unencoded financial message.

The invention further concerns the embodiment of such computer-implemented methods, wherein the data compression technique is customized so that the coding scheme allocates shorter codes to order-units having a higher p-value, and longer codes to order-units having a lower p-value present in the unencoded financial message.

The invention further concerns the embodiment of such computer-implemented methods, wherein the data compression technique is adaptive to permit the coding scheme to adjust over time to allocate shorter codes to order-units having a higher p-value, and longer codes to order-units having a lower p-value present in both the unencoded financial message and in at least one previously communicated financial message.

The invention further concerns the embodiment of such computer-implemented methods, wherein the data compression technique employs an Arithmetic Algorithm or a Huffman Algorithm.

The invention further concerns the embodiment of such computer-implemented methods, wherein the Broker Computer decodes the encoded version of the financial message and then communicates the resultant unencoded version of the financial message to the Market Exchange.

The invention further concerns the embodiment of such computer-implemented methods, wherein the Broker Computer employs a data compression technique to establish a Broker coding scheme and employs the Broker coding scheme to produce a Broker encoded version of the financial message based on order-units present in the financial message and in at least one other financial message that is to be communicated by the Broker to the Market Exchange.

The invention further concerns the embodiment of such computer-implemented methods, wherein the data compression technique employed by the Broker Computer is customized so that the coding scheme allocates shorter codes to order-units having a higher p-value, and longer codes to order-units having a lower p-value present in the financial message and in the at least one other financial message that is to be communicated by the Broker Computer to the Market Exchange.

The invention further concerns the embodiment of such computer-implemented methods, wherein the data compression technique employed by the Broker Computer is adaptive so that the coding scheme is adjusted over time to allocate shorter codes to order-units having a higher p-value, and longer codes to order-units having a lower p-value present in both the unencoded financial message and in at least one previously communicated financial message.

The invention further concerns the embodiment of such computer-implemented methods, wherein the financial message is an offer for purchase or sale of a financial interest.

The invention further concerns a computer-implemented method for enhancing the efficiency of digitally communicating and fulfilling, a financial message from a first computer to a second computer, which method comprises the steps:
  (A) employing a data compression technique to establish a coding scheme and employing the coding scheme to produce a database that enables:
    (1) the formation of an encoded version of an unencoded financial message based on order-units present in the unencoded financial message; and
    (2) the decoding of the encoded version of the financial message; wherein the message length of the encoded version of the financial message is shorter than the message length of the unencoded financial message;
  (B) providing the database to the first and second computers;
  (C) digitally communicating the encoded version of the financial message from the first computer to the second computer, directly or via one or more intermediate computers; and (E) fulfilling the financial message, wherein the financial message is a request for information relating to a financial interest.

The invention further concerns the embodiments of such computer-implemented methods wherein the financial message is a communication pertaining to financial information. The invention particularly concerns the embodiments of such computer-implemented methods wherein the financial message is: a request for information relating to a financial interest, a request for information relating to the status of a financial interest, a request for information relating to the value of a financial interest, a request for information relating to news concerning a financial interest; an offer for purchase of a financial interest, an offer for sale of a financial interest, an agreement to purchase a financial interest, or an agreement to sell a financial interest, a communication responding to any such requests, a communication confirming the execution of any such order, or a communication confirming any such agreement. The invention particularly concerns the embodiments of such computer-implemented methods wherein the financial message is selected from the group consisting of an order to buy a stock, an order to sell a stock, and an order for a futures contract (e.g., an order to purchase a futures contract and an order to sell a futures contract, an order to sell short and an order to buy to cover, etc.).

The invention further concerns the embodiment of such computer-implemented methods, wherein the financial message is an agreement to purchase or sell a financial interest, or a confirmation thereof.

The invention further concerns a computer system, comprising a first and a second computer, in digital communication with one another, wherein the computer system is specially adapted for enhancing the efficiency of digitally communicating a financial message, and wherein:

(A) the first computer employs a data compression technique to establish a coding scheme and employs the coding scheme to produce an encoded version of the financial message based on order-units present in the financial message, wherein the message length of the encoded version of the financial message is shorter than the message length of the unencoded financial message; and (B) the second computer contains a stored copy of the database and, upon receiving the encoded version of the financial message, employs the stored database to decode the encoded version of the financial message.

The invention further concerns the embodiment(s) of such computer system wherein the data compression technique is:

(A) customized so that the coding scheme allocates shorter codes to order-units having a higher p-value, and longer codes to order-units having a lower p-value present in the unencoded financial message; and/or (B) adaptive to permit the coding scheme to adjust over time to allocate shorter codes to order-units having a higher p-value, and longer codes to order-units having a lower p-value present in both the unencoded financial message and in at least one previously communicated financial message.

The invention further concerns the embodiment(s) of such computer systems wherein the first computer is a Client Computer and the second computer is a Broker Computer in digital communication with the Market Exchange; or the first computer is a Broker Computer and the second computer is a Market Exchange Computer. The invention further concerns the embodiment of such computer systems wherein the first computer is a Client computer and the second computer is a Broker Computer in digital communication with the Market Exchange, and wherein the Broker Computer employs a data compression technique to establish a Broker coding scheme and employs the Broker coding scheme to produce a Broker encoded version of the financial message based on order-units present in the financial message and in at least one other financial message that is to be communicated by the Broker to the Market Exchange.

The invention particularly concerns the embodiments of such computer systems wherein the first computer is a Gateway Computer Node of a Broker Computer and the second computer is another Node (e.g., a Risk Management Node) of that Broker Computer; or wherein the first computer is a Gateway Computer Node of a Market Exchange and the second computer is a Matching Engine Computer Node of the Market Exchange Computer.

The invention further concerns the embodiment(s) of such computer systems wherein the data compression technique employed by the Broker Computer is:

(A) customized so that the coding scheme allocates shorter codes to order-units having a higher p-value, and longer codes to order-units having a lower p-value present in the financial message and in the at least one other financial message that is to be communicated by the Broker Computer to the Market Exchange; and/or (B) adaptive so that the coding scheme is adjusted over time to allocate shorter codes to order-units having a higher p-value, and longer codes to order-units having a lower p-value present in both the unencoded financial message and in at least one previously communicated financial message.

The invention further concerns the embodiments of such computer systems wherein the Market Exchange Computer executes the financial message.

BRIEF DESCRIPTION OF THE DRAWINGS

FIGS. 4A-4E illustrate computer networks capable of employing the methods of the present invention. Connections shown with in dark fill indicate connections employing the methods of the present invention.

DETAILED DESCRIPTION OF THE INVENTION

Figure 1:
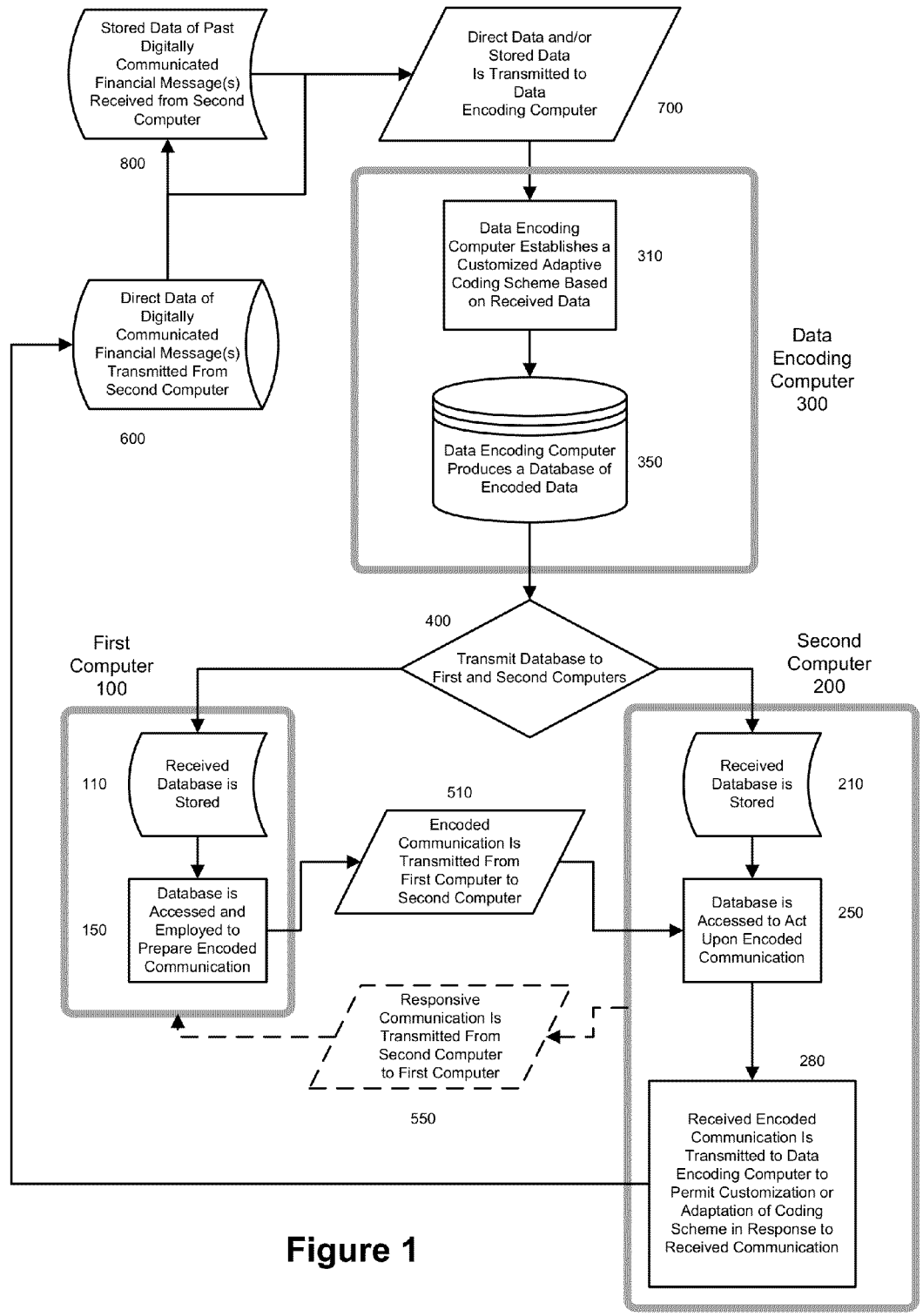
FIG. 1 illustrates exemplary system architecture of an embodiment of the present invention in which an adaptive customized database is employed to facilitate communication of a financial message between a First Computer (100) and a Second Computer (200).

The present invention relates to a method for enhancing the efficiency of digitally communicated data exchanges, and to computer system that implements such a method. The invention particularly concerns such methods and systems in which the enhanced efficiency is achieved using any of the following enhancement strategies:

1. compression techniques (custom, adaptive or adaptive custom);
2. binary integers ("bits") as the native language of some or all of the system;
3. massively parallel processing;
4. database optimization techniques, and
5. calculation optimization techniques.

The invention contemplates methods and systems that employ only one of these enhancement strategies, as well as methods and systems that conjunctively (i.e., sequentially or simultaneously) employ any 2 of these strategies, any 3 of these strategies, any 4 of these strategies, or all 5 of these strategies.

As used herein, the term "data" refers broadly to digitally processable information. The term "information" denotes the valued content of the data (i.e., information within data). Such information may include "financial information," which is information that pertains to the value, nature, duration, conditions, or other parameters relevant to information affecting a "financial interest" (e.g., a stock, an option position, a futures position, cash, a negotiable or non-negotiable instrument, a commodity, a bond, a note, etc.). As used herein, information is said to affect a financial interest if it relates to the initiation, execution or confirmation of a financial message. As used herein, a "financial message" is a data communication concerning a financial interest. Examples of a financial message include a request for information relating to a financial interest or the status, value of or news regarding such an interest; the provision of information responsive to such a request; an offer for purchase of a financial interest; an agreement to purchase a financial interest; an offer for sale of a financial interest; an agreement to sell a financial interest; a message requesting or confirming or updating the status of a previous financial message, price information relating to a financial interest, news relevant to any aspect of a Market Exchange, etc.

As used herein, a "data exchange" is a data communication between two or more nodes of a communication network that conveys information. In particular, such data exchanges may be a one-way communication (in which data is communicated from one node of the communication network to one or more nodes, without any receiving response). Alternatively, such data exchanges may be a two-way communication (in which data is communicated from one node of the communication network to one or more nodes, and engenders a receiving response). Such exchanges may be direct (from the originating node to the ultimate desired recipient node) or may be indirect (in which one or more intervening nodes receive and relay the data from the originating node to the ultimate desired recipient node). Of particular interest to the present invention are data exchanges relevant to a financial interest (e.g., a request for a status update and the responsive update, etc.) or capable of causing the transfer of the financial interest from one party to another party.

As used herein, a plurality of computer devices, configured to digitally communicate with one another comprises a "computer system." The computer system may be of any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a switched fabric network (e.g., an INFINIBAND® switched fabric network), a SDH (Synchronous Digital Hierarchy) network, a wireless network, and a wireline network. In some embodiments, the computer system may comprise a wireless link, such as an infrared channel or satellite band. The network may have any topology (e.g., a bus, star, or ring topology, etc.). The computer system and computer system topology may be of any such computer system or computer system topology as known to those ordinarily skilled in the art capable of supporting the operations described herein. Connections and networks included in the connections may comprise the Internet, local networks, web servers, file servers, routers, databases, computers, servers, network appliances, cell phones or any other computing devices capable of sending and receiving data, especially digital data. The computer system may comprise computing devices connected via cables, IR ports, wireless signals, or any other means of connecting multiple computing devices. The computer system and any devices connected to the computer system may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g, IEEE 802.11n, and direct asynchronous connections, or any combination thereof. The computer system may comprise mobile telephone networks utilizing any protocol or protocols used to communicate among mobile devices, including AMPS, TDMA, CDMA, GSM, EDGE, GPRS or UMTS.

The enhanced efficiency of digitally communicating such data exchanges provided by the present invention may be described in terms of reducing the "latency" of financial message execution. The term latency has multiple definitions in the art, for example, denoting the time required to send an amount of data one way, or the time required to send data round-trip. The amount of data used to measure latency can also vary and will affect the latency time. As used herein and unless otherwise specified, the term "latency" denotes the time it takes to send information from one location to another. The enhanced efficiency of digitally communicating such data exchanges provided by the present invention may be measured by any convenient means, e.g., in terms of the maximum number of transactions processable per unit time, or the average size (memory load) per transaction, etc. Preferably, the methods of the present invention will provide at least a 5% enhancement of data exchange efficiency, more preferably, at least a 10% enhancement of data exchange efficiency, more preferably, at least a 20% enhancement of data exchange efficiency, more preferably, at least a 50% enhancement of data exchange efficiency, more preferably, at least a 2-fold enhancement of data exchange efficiency, more preferably, at least a 5-fold enhancement of data exchange efficiency, more preferably, at least a 10-fold enhancement of data exchange efficiency, more preferably, at least a 20-fold enhancement of data exchange efficiency, and more preferably, at least a 50-fold enhancement of data exchange efficiency, all relative to the efficiency achieved in the absence of the present invention.

I. Efficiency Enhancement Strategies of the Present Invention

A. Adaptive Custom Compression Techniques

In preferred embodiments, the present invention achieves such enhanced efficiency of digitally communicating such data exchanges using a custom compression technique, an adaptive compression technique, or most preferably, an adaptive custom compression technique, to produce a coding scheme. As used herein, the term "custom" as applied to a compression technique denotes that the employed compression technique is capable of producing a coding scheme that is capable of permitting the communication of data in a manner that is more efficient than ordinary language (e.g., English, ASCII, etc.). Such "custom" compression techniques will typically be established for particular types of data (e.g., to produce a coding scheme customized to communicate "financial information," etc.). As used herein, the term "adaptive" as applied to a compression technique denotes that the employed compression technique is capable of producing a coding scheme that is capable of changing to communicate expected future information with increased efficiency. In one embodiment, this may be accomplished by changing the coding scheme in response to actual information being communicated or in response to changes in expected information to be communicated in the future. Most preferably, the employed compression technique will be an adaptive, custom compression technique.

In accordance with the principles of the present invention, the efficiency of data exchange (and hence information exchange) is enhanced by decreasing the amount of data that must be communicated to effect a data exchange. "Entropy" is herein defined as the average information content one is missing when one does not know the value of a random variable (see, Shannon, C. (1949) "*A Mathematical Theory of Communication*," In: "THE MATHEMATICAL THEORY OF COMMUNICATION," Shannon, C. et al., The University of Illinois Press, Urbana, Ill., pp. 1-54). Lower entropy means that the data is more redundant, and therefore more compressible. Conversely, higher entropy means that the data is less redundant, and therefore less compressible. Entropy can be measured and calculated in several ways, which are commonly differentiated by "order." The "self-information" of an order-unit S with a frequency, weighting, or other scalar metric, p-value is:

$$H(S)=\lg(1/p)=-\lg p$$

An "order-unit" is a unit that is encoded (e.g., a symbol, digram, trigram, higher-order multigram, word, term, message, basket, etc.). The first-order entropy, which takes into account only the frequency of individual symbols, is $-\Sigma p\lg p$.

The term "order-unit frequency" denotes the frequency with which a particular order-unit (based on the employed order of entropy) appears in data. An "order-unit frequency" can be, for example, a "symbol frequency" (i.e., a number, letter or character), a "digram frequency" (i.e., the frequency of combinations of two symbols, e.g., "aa", "ab", etc.), a "trigram frequency" (i.e., the frequency of combinations of three symbols, e.g., "aaa", "aab", etc.), a "higher order multigram frequency" (i.e., the frequency of combinations of four or more symbols), a "word frequency" (i.e., a collection of symbols that comprise words, e.g., "buy", "sell", "100", etc.), a "term frequency" (i.e., a collection of words, e.g., "buy 100 shares," etc.), a "message frequency" (i.e., a collection of terms, e.g., buy 100 shares of Stock X, etc.), a "basket frequency" (i.e., a collection of messages), etc. A coding scheme that takes only individual symbol frequencies into account cannot be more efficient than first-order entropy. For any data exchange, as the hierarchical entropy order of the coding scheme increases, the number of codes needed to communicate that message between two or more nodes decreases and the length of the message (in bits) decreases. However, the population of the universe of codes increases. It is preferred to employ a coding scheme that employs the highest hierarchical entropy order feasible in light of the memory requirements needed to store the coding scheme.

Coding efficiency, communication performance, and/or processing performance can be improved by using a custom coding scheme that is optimized for the expected information to be communicated rather than a coding scheme designed for general English usage, such as ASCII. The first-order entropy of the English language is approximately 4 bits per character based on normal English text. Financial information is usually far more redundant than general English text, and therefore has lower entropy and is thus more compressible than general English text.

By assuming that future information will be related to previous information, a coding scheme can be further optimized for the expected future information. In a preferred embodiment of the invention, an algorithm is used to predict and determine such expected p-value (e.g., symbol frequency, word frequency, etc.). In a preferred embodiment of the invention, such an algorithm is implemented in real-time, thereby allowing the system to immediately adapt to changes in observed information communicated.

The algorithm preferably uses a simple moving average or a weighted moving average based on previously communicated financial messages. An example of a weighted moving average is an average that is "time weighted," and which would therefore apply more or less weight to more recent financial messages. Alternatively, an advanced prediction model, such as a neural network, bayesian learning, and/or other artificial intelligence methods may be used to form a very sophisticated model for expected p-values.

Although the foregoing description relates p-values to order-units (e.g., character, word, message, basket or trade frequency), it will be understood that the employed p-values can be based on any scalar or metric that the Client, Broker, Market Exchange, etc. desires. In one embodiment, for example, p-values may be set using an importance scale that ranks order-unit values from those most important to a trader's goals to those least important to a trader's goals. If a certain order-unit value is more critical or time sensitive than another order-unit value, it could be assigned a greater relative p-value. In another example, messages to cancel a previously sent order would be given a higher p value than an order to buy or sell. The scale that one chooses to use to determine p value can be based upon one or more quantitative metric(s), one or more qualitative metric(s) or both one or more quantitative and one or more qualitative metric(s).

As used herein, such custom compression techniques are said to be applied to an "unencoded" financial message. As used herein, the term "unencoded" denotes a financial message prior to the application (or, as discussed below, the further application) of a coding scheme based upon the p-values of order-units in the message. An "unencoded" financial message may thus be in a human linguistic language (e.g., English, German, Japanese, etc.), or in a coding scheme (such as ASCII, FIX, etc.) that is not based upon the p-values of order-units in the message. Alternatively, an "unencoded" financial message or order may be in a coding scheme that is based upon the p-values of an order-unit in the message, provided that the applied custom compression technique is employed to encode the financial message in a coding scheme that is based upon the p-values of a higher order-unit in the message.

In one preferred embodiment of the invention, messages are communicated between two computers or among two or more computers of a network in digital communication with one another and are encoded using one coding scheme or multiple coding schemes. Although any such two or more computers (including nodes of a computer system as well as unaffiliated computers) can be used in accordance with the present invention, for simplicity of explanation, the invention is described with respect to a preferred embodiment in which the computers may be a client computer ("Client" or "Client Computer"), a broker computer ("Broker" or "Broker Computer"), or a "Market Exchange." As used herein, a "Client Computer" is a computer that, for example, initiates a communication on behalf of an account holder. As used herein, a "Broker Computer" is a computer of an intermediary that, for example, communicates the request of a client to a Market Exchange Computer. As used herein, the term "Market Exchange" denotes a computer of a Market Exchange, Dark Pool, Electronic Communications Networks (ECNs), etc., which is typically a terminal node of a financial network structure.

In one embodiment, the client computer ("Client") and the broker computer ("Broker") would each maintain a synchronized database, herein referred to as the "Client-Broker Databases." Upon adding a coding scheme to one location of the database, the coding scheme would be sent to the other location of the database. The Client could calculate the most efficient new coding scheme for a message to be communicated, then add the new coding scheme to the database, and then send the encoded message to the Broker. Alternatively, the Client could use a preexisting coding scheme (formed, for example, using prior financial messages) in the Client-Broker Database to encode and then send the message to the Broker. In a further alternative, the Client could modify a coding scheme that already exists in the database, the database would then communicate the changes to the coding scheme to the other location of the database, and then the Client would send the message encoded with the modified coding scheme to the Broker. The Client or Broker would determine the most efficient way to communicate the message information, taking into account the expected frequency that a coding scheme will be used, the size of data that needs to be communicated to add or change the database, and the size of the message that communicates the originally intended information such as an order to buy or sell.

The invention contemplates the use of a coding algorithm to form a coded database of order-units. In one embodiment, such coding algorithm is a "Huffman Algorithm" (Huffman, D. A. (1952) "*A Method for the Construction of Minimum-Redundancy Codes*", Proc. I.R.E., September, pp 1098-1102; Hashemian, R., (1993) "*High Speed Search And Memory Efficient Huffman Coding*," IEEE International Symposium on Circuits and Systems, ISCAS '93, Volume 1, pp. 287-290; Hashemian, R. (1994) "*Design and Hardware Implementation of a Memory Efficient Huffman Decoding,*" IEEE Transactions on Consumer Electronics, Volume: 40(3):345-352; Hashemian, R. (1995) "*Memory Efficient and High-Speed Search Huffman Coding,*" IEEE Transactions on Communications, 43(10):2576-2581; Hashemian, R. et al. (2001) "*Reduced Code Transmission And High Speed Reconstruction Of Huffman Tables*," Pacific Rim Conference on Communications, Computers and Signal Processing, Volume 1, pp. 180-183; Hashemian, R. (2002) "*Condensed Huffman Coding, a New Efficient Decoding Technique*," The 2002 45$^{th}$ Midwest Symposium on Circuits and Systems, Volume 1, pp. 228-231; Hashemian, R. (2003) "*Direct Huffman Coding and Decoding using the Table of Code-Lengths*," Proceedings ITCC 2003, International Conference on Information Technology: Coding and Computing, pp. 237-241; Hashemian, R. (2004) "*Condensed Table of Huffman Coding, a New Approach to Efficient Decoding*," IEEE Transactions on Communications, 52(1):6-8; Connell, J. B. (1973) "*A Huffman-Shannon-Fano Code*," Proc. IEEE, July, pp. 1046-1047, U.S. Pat. Nos. 7,564,379; 7,538,696; 7,460,595; 7,375,660; 7,358,870; 7,333,037; 7,283,591; 7,190,287; 7,129,864; 7,106,794; 7,064,489; 6,304,197; 6,292,114; 6,271,689; 6,215,422). The Huffman Algorithm results in the production of a coding scheme that allocates shorter codes to an order-unit having a higher p-value, and longer codes to an order-unit having a lower p-value, resulting in a reduced total length as long as the expected and ultimately observed frequencies are close. Variants of the Huffman Algorithm may alternatively be employed. Similarly, other compression algorithms may be employed in lieu of the Huffman Algorithm and its variants, provided that their use increases the efficiency of data exchange in accordance with the present invention. Alternative coding schemes may also be employed in accordance with the present invention Alternatively (or additionally), the employed coding algorithm may be an "Arithmetic Algorithm." Examples of Arithmetic Algorithms are provided in U.S. Pat. Nos. 4,122,440; 4,286,256; 4,467,317; 4,652,856; 4,891,643; 4,905,297; 4,933,883; 4,935,882; 4,989,000; 5,099,440; and 5,272,478. For example, a sequence of symbols can be represented as a rational number between 0 and 1 in base 3, where each digit represents a symbol (e.g., the sequence "ABBCAB" could become 0.011201 base-3). The next step is to encode this ternary number using a fixed-point binary number of sufficient precision to recover it, such as 0.001011001 base-2— this is only 9 bits, 25% smaller than the naive block encoding. This is feasible for long sequences because there are efficient, in-place algorithms for converting the base of arbitrarily precise numbers. Finally, knowing the original string had a length of 6, one can simply convert back to base 3, round to 6 digits, and recover the string.

In one embodiment, the same coding scheme may be employed in both directions of a two-way communication (e.g., from Client to Broker, Broker to Client; Broker to Exchange, Exchange to Broker). There is, however, no need to use the same coding scheme for both directions, and because the content of messages in each direction may be different, there is a potential benefit to using a custom coding scheme for not only each data exchange, but for each direction of a two-direction (or multi-direction) data exchange.

The invention thus contemplates the use of a coding algorithm to form a coded database of order-units that allocates shorter codes to order-units having a higher p-value, and longer codes to order-units having a lower p-value. In one embodiment, an initial database is formed based on anticipated p-values (for example, assigning higher p-values to more commonly traded securities, more common messages, etc.). Alternatively, the initial database is formed based on the experienced past history of traded securities, messages, etc. using the experienced p-values of such transactions. The initial database is preferably refined, either in real-time, or at interval (e.g., once each hour, daily, after every 1,000 messages, etc.) to adapt to the p-values of actually occurring messages. The database is preferably stored in computer memory and shared, as discussed herein, with other computers or computer nodes of the network.

B. Binary Integers ("Bits") as the Native Language of Some or All of the System

In preferred embodiments, the present invention alternatively or additionally achieves such enhanced efficiency of digitally communicating such data exchanges using binary integers ("bits") as the native language of some or all of the system. In prior communications protocols, information is converted into bits and then re-converted back into a human-perceptible language (e.g., ASCII, etc.). In the preferred embodiments of the present invention, binary integers ("bits") are employed as the native language of some or all of the system without conversion into a human linguistic language (e.g., English, German, Japanese, etc.). By maintaining bits as the native language, the present invention achieves enhanced efficiency of digitally communicating such data exchanges. As an example, in order to convey the information "100", a conventional protocol would need to transfer a message of 24 bits (i.e., 00110001 00110000 00110000), whereas the present invention, by natively maintaining data in binary would require only 7 bits (i.e., 1100100), thereby increasing efficiency by 242%.

C. Massively Parallel Processing

In preferred embodiments, the present invention alternatively or additionally achieves such enhanced efficiency of digitally communicating such data exchanges using massively parallel processing. Methods for massively parallel processing that may be adapted to the present invention are disclosed in U.S. Pat. Nos. 7,555,566; 7,523,130; 7,478,278; 7,454,749; 7,444,385; 7,404,015; and 7,304,999.

D. Database Optimization Techniques

In preferred embodiments, the present invention alternatively or additionally achieves such enhanced efficiency of digitally communicating such data exchanges using database optimization techniques. The present invention preferably comprises the use of one or more databases to store the coding scheme being used by the Client and Broker. In preferred embodiments, the present invention alternatively or additionally achieves such enhanced efficiency of digitally communicating such data exchanges using database optimization techniques.

Such techniques include segmenting one or more of the databases to decrease the amount of data that typically needs to be searched. In one embodiment, the database search time is improved by segmenting the employed coding scheme into multiple sections. Since the coding scheme takes into account the p-value, rather than performing a search of the entire coding scheme, the search could begin with the segment of the coding scheme with the highest p-value. If the result is located within this section, the search may be faster. If the search within just this segment is not successful, the computer could continue by moving on to search the segment with the next highest p-value, and so on, until the search is successful. Methods for database optimization that may be adapted to the present invention are disclosed in U.S. Pat. Nos. 7,580,854; 7,574,424; 7,571,397; 7,552,110; 7,519,582; 7,512,591; 7,430,562; 7,359,926; 7,321,897; 7,281,000; 7,254,273; 7,233,939; 7,213,012; 7,206,644; and 7,200,595; in United States Patent Publication No. US 2005/0197916; in Canadian Patent Application CA 2151023, in European Patent Publication Nos. EP 0687111A2 and EP 1223677A2, and in PCT Publication Nos. WO 81/03560A1; WO 97/35383A1; WO 97/35427A1; WO 02/060067A2; WO 02/27644A1 and WO 06/005151A1.

E. Calculation Optimization Techniques

In preferred embodiments, the present invention alternatively or additionally achieves such enhanced efficiency of digitally communicating such data exchanges using calculation optimization techniques. Computers may employ single precision (for example, carrying calculations to 8 bits), double precision (for example, carrying calculations to 16 bits) or greater precision calculating processes. In a conventional set of calculations, all of the calculations are conducted at double precision.

In a preferred embodiment, the methods of the present invention will provide the accuracy of double precision output, but will do so at nearly the speed of single precision output methods. This may be accomplished by relying upon the order of mathematical operations to transiently convert one or more terms of a calculation (e.g., the initial entries, or the calculated value of an initial calculation, etc.) into term(s) having only integer values (i.e., having no digits right of the decimal point). Once such calculations are completed, all intermediate subsequent calculations are single precision calculations, which can be performed at greater efficiency than double precision calculations. Fewer, and in some cases only a single, additional double precision calculation are required to complete the task. In an alternative embodiment, all integer values of a series of terms will be subjected to single precision calculation separately from any non-integer components of such terms. The non-integer components of such terms will be transiently converted into integer form, processed via single precision and then re-converted in a double precision calculation into a final term that will then be processed with the output of the separately processed integer terms.

The above-described calculation optimization techniques can be used to improve the performance of any level of precision (for example precision greater than double; triple precision, etc.).

II. Exemplary System Architecture of the Present Invention

FIG. 1 illustrates exemplary system architecture of an embodiment of the present invention in which an adaptive customized database is employed to facilitate communication of a financial message between a First Computer (100) and a Second Computer (200). As shown in FIG. 1, data, either obtained from past digitally communicated financial messages (600) or from current digitally communicated financial messages (800) is transmitted (700) to a Data Encoding Computer (300). The Data Encoding Computer (300) processes such received data to form an adaptive customized coding scheme (310), and then uses this coding scheme to produce a database of encoded data (350). The Data Encoding Computer transmits (400) the produced database to the First (100) and Second (200) Computers. The First Computer (100) stores the received database (110) and accesses and employs it in order to prepare the encoded message (150). The encoded message is then transmitted (510) from the First Computer (100) to the Second Computer (200). The Second Computer (200), having received the transmitted database (400) from the Data Encoding Computer (300), stores such database (210), such that it is able to access the stored database (210) and comprehend and act upon (250) the encoded message that has been transmitted (510) from the First Computer (100). Optionally, the Second Computer (200) provides a responsive communication (550) (which may be encoded or unencoded) to the First Computer (100). The Second Computer (200) transmits (280) the received encoded communication (510) to the Data Encoding Computer (300) either substantially concurrently with its receipt of such data (600) or at a subsequent time, after first storing the encoded communication (800). The data is then transmitted (700) to the Data Encoding Computer (300). The coding scheme (310) is then adaptively customized in response to the transmitted data (700) to reflect changes in the financial data being actually communicated by the First Computer (100) to the Second Computer (200). Thus, the coding scheme (310) is adaptively customized in response to actual communications from the First Computer (100) in order to provide an increasingly efficient database of encoded data (350).

III. Operation of an Efficient Database of the Present Invention

The operation of an efficient database of the present invention is illustrated below with respect to a Client-Broker network. A Client-Broker network is created by interconnecting a Client computing device and a Broker computing device. The network is maintained to digitally store, access and use a Client-Broker database (which may be an array, list, etc., but is preferably a relational, queryable database). The network connecting the Client and the Broker is not necessarily maintained by the Client or Broker.

The database is preferably synchronized in response to changes posted by either the Client or the Broker. Most preferably, the Client and Broker copies of the Client-Broker database will remain synchronized in real-time (i.e., essentially instantaneously) by virtue of their network interconnectivity.

In one embodiment, multiple coding schemes will be employed by the Client and Broker. Alternatively, different Clients may use different coding schemes with the same or different Brokers. In a preferred further embodiment, one coding scheme will be employed by a Client and its Broker. In one embodiment, the coding scheme(s) employed will further comprise the use of one or more types of delinineators (e.g., a comma separating two adjacent fields of a message).

The Client-Broker database is adapted to store coding scheme data. In embodiments of the invention, the database can additionally or alternatively store other data (e.g., account information, financial messages, order history, order status, log of each message sent and/or received, account balance, etc). Because computers natively communicate and process information in binary, the efficiency of data exchanges can be enhanced by causing the network to communicate, encode, and decode messages between the Client and Broker into binary. Initially, before the first order is sent from the Client to the Broker, the Client will analyze (manually or autonomously) the expected data exchange and define in the database one or more coding scheme(s) that is/are relevant to that exchange. The coding schemes will be optimized toward sending the expected messages with maximum compression. Alternatively, a universal baseline coding scheme can be used (i.e., a coding scheme that is instituted without any client analysis of the expected data exchange). This would be similar to FIX Protocol, but rather than using ASCII, it would use an alternative, and preferably publicly available, coding scheme that is more optimized for financial message data.

Such message compression of the coding schemes can be optimized in several ways. Preferably, the compression would be optimized by the expected frequency of orders being sent. Alternatively, it could be optimized by the expected importance of messages sent, or by the expected time density of orders being sent. In one embodiment, when the Client adds the initial coding schemes into the Client-Broker database, it will automatically synchronize with the Broker's copy of the database, thereby adding these coding schemes into both locations of the Client-Broker database. To send an order, the Client computer determines the most efficient coding scheme either by calculating a new coding scheme using a compression algorithm of the Client's choice, or using an existing coding scheme from the Client-Broker database. The Client computer then encodes the order details into a highly compressed message using the chosen coding scheme, and sends that message to the Broker computer. The Broker then decodes the message using the coding scheme defined in the synchronized Client-Broker database.

There is usually a "many Clients to one Broker" relationship in the Market Exchanges. The Broker then becomes similar to a "Client" for the next phase of the process. It creates and maintains a Broker-Market Exchange database (which is preferably independent from the Client-Broker databases stored on the Broker computer). The Broker-Market Exchange database is maintained in synchrony with a copy of the database at the Market Exchange. The Broker would then decode the orders of all Clients into a common coding scheme shared by the Market Exchange. The Broker then encodes the bulk set of messages/orders with a coding scheme that achieves optimized compression (for the entire bulk set rather than any individual financial message). This means that some messages may be less than optimally compressed if being sent individually, however, the total length of the encoded bulk set of messages will still be less than the total length of the individually compressed messages. This "Broker to Market Exchange" coding is done in the same way as the "Client to Broker" coding.

There is usually a "many Brokers to one Market Exchange" relationship in the financial markets. The Market Exchange then receives the encoded messages from Brokers, then decodes the messages, standardizes the messages into a common coding scheme. The Market Exchange then sends the standardized encoded messages to the matching engine, which matches buy and sell orders. The Market Exchange typically then sends confirmation messages back to the Broker, which then sends confirmation messages back to the Client. The backward messages (i.e., from Market Exchange to Broker to Client) are encoded in the same way, but not necessarily using the same coding scheme, as messages being sent forward (i.e., from Client to Broker to Market Exchange).

As discussed above, the entropy of a message varies with the type and predictability of information. Therefore, there is no single encoding algorithm for all possible messages that yields individual messages with optimal compression. The system can be made more efficient by using multiple coding schemes, each optimized for different messages. The encoding algorithm itself can also be made more efficient by taking into account additional information beyond just symbol frequency (first-order entropy). Each Client should optimize the system with high-order entropic analysis, however there is no requirement to do this. If the Client would like a simple system that does not need any analysis of expected information, the system will still be able to operate, however with less than full potential efficiency. The system can update the database, in real-time, with new or improved coding schemes. The system can update the coding schemes by using algorithms that analyze and predict the frequency of content within future messages. This will allow the system users to always send messages with increased compression, near-optimal compression or optimal compression.

If desired, other information to be communicated, such as packet header information (possibly containing information like address to send the packet to, client identifier, error correcting codes, etc.) may be included in the p-value distribution calculations. By including possible header information into the compression analysis, a smaller total packet size (header and body) may be achieved. Additionally, the total size of the packets can be reduced by optimizing to the connection type. For example, Clients connecting to Brokers through a public network such as the internet may require standard coding for the header of the packet, so that the internet routers know where to send the packet. Clients that connect directly to Brokers using connections such as a dedicated line or optical connection directly from their location to the Broker location may not need to use standard coding or formatting for the packet header if only one possible delivery address exists. The total packet size can be reduced for this type of connection, by using a custom coding scheme for header information and/or not including certain header information that would otherwise be included in a packet sent over the internet.

The entire message to be communicated does not necessarily need to be sent as one packet. The message can be split into two packets or into multiple packets for reconstruction by the recipient. Such packet splitting provides the advantage of increased reliability of transmission, but is accompanied by the disadvantage of increased total communication size. The increased reliability reflects the fact that if bits are disturbed along the communication process, only the single packet containing such bits will be affected. Correction of erroneous bit(s) may be accomplished with error correcting code techniques as are known in the art or by requesting that the damaged packet be resent.

Resending a packet containing only a fraction of a total message will require less resources than resending the entire message, but will typically require some header information (to instruct delivery, or to provide information necessary to reconstruct the multiple packets into the complete original message) to accompany the resent packet. Therefore the overhead (total overhead, as well as overhead relative to packet body payload) will increase. The system will typically determine the optimal packet size (e.g., complete message, some percentage of the complete message per packet, or a fixed maximum packet size). In one embodiment this could be determined using user input, and/or algorithms (as is known in the art). These algorithms are preferably adaptive compression algorithms, as described herein. When using a reliable communication method such as TCP, the packet recipient typically will send an acknowledgment back to the sender to confirm successful receipt of a packet. The size of a TCP acknowledgment is commonly 60 bytes. Including the TCP packet acknowledgement as well as any or all other communication protocol messages into the distribution of p values may decrease the total amount of data that needs to be communicated. Ideally, one would want to include all possible information that is expected to be communicated (message body, communication protocol like TCP, etc.) into the distribution of p-values.

Although the above description relates to computer systems having a Broker intermediary, it will be understood that the same principles may be readily adapted to the scenario in which the Client elects to interact with the Exchange Market directly (i.e., placing financial messages itself with the Exchange Market in the absence of a Broker). In such a circumstance, the "Broker" is the Exchange Market. Similarly, the methods and computer systems of the present invention relate to data exchanges between one or more Client Computer(s) and a Broker Computer, to data exchanges between one or more Broker Computer(s) and a Market Exchange Computer. Additionally, the methods and computer systems of the present invention also relate to data exchanges involving two computers or among two or more computers that are internal nodes of a multi-node Client Computer, or internal nodes of a multi-node Broker Computer, or internal nodes of a multi-node Market Exchange Computer. For example, the first and second computers of the present invention may be a Gateway node of a Client Computer (whose function may, for example, be to collect, process and relay Client orders and requests) and a Pipeline node of the Client Computer (whose function may, for example, be to receive, process and relay Gateway orders and requests). Similarly, the first and second computers of the present invention may be a Gateway node of a Broker Computer (whose function may, for example, be to receive, process, bundle and relay Client orders and requests) and a Pipeline node of the Broker Computer (whose function may, for example, be to receive, process and relay Gateway orders and requests). Likewise, the first and second computers of the present invention may be a Gateway node of a Market Exchange Computer (whose function may, for example, be to receive, process, and relay Client and/or Broker orders and requests) and a Matching Engine node of the a Market Exchange Computer (whose function may, for example, be to receive, process, relay and/or fulfill Gateway orders and requests). Thus, the methods of the present invention are applicable to data exchanges involving Client A-Client B, Client-Broker, Broker A-Broker B, Broker-Market Exchange, etc., as well as to data exchanges involving nodes (i.e., two or more computers) of the same Client, of the same Broker, or of the same Market Exchange Computer.

Having now generally described the invention, the same will be more readily understood through reference to the following examples, which are provided by way of illustration and are not intended to be limiting of the present invention unless specified.

Example 1

Comparison of Efficiency for First-Order and Second-Order Coding Schemes

In the example below, the current solution (FIX Protocol) and methods of the present invention are compared with respect to the communication of data to effect an order to arbitrage the equities in the Dow Jones Industrial Index and mini-DOW futures contracts. The plaintext English of the information needed to communicate to the Broker and ultimately the Market Exchange is formatted below in the field order: Action (buy, sell, sell short, buy to cover), Quantity (of shares or contracts), Ticker Symbol, Order Type (market, limit, etc.). Each field in the PlainText is delineated by a space punctuation, and information for each order is delineated by a paragraph mark.

Tables 1, 2 and 3 illustrate the comparative coding of a series of financial messages using, respectively, the FIX Protocol, a first-order entropy (symbol) custom compression coding scheme and a second-order (word) custom compression coding scheme. In Tables 1, 2 and 3, each employed order-unit is shown separated from other order-units by brackets; such brackets are merely for the purpose of illustration and are not part of the data exchange.

TABLE 1

| PlainText | FIX Protocol |
|---|---|
| sell short 6 @ym# market | [5] [4] [=] [5] [|] [3] [8] [=] [2] [2] [4] [|] [5] [5] [=] [@] [y] [m] [#] [|] [4] [0] [=] [1] |
| buy 224 aa market | [5] [4] [=] [1] [|] [3] [8] [=] [2] [2] [4] [|] [5] [5] [=] [a] [a] [|] [4] [0] [=] [1] |
| buy 214 att market | [5] [4] [=] [1] [|] [3] [8] [=] [2] [1] [4] [|] [5] [5] [=] [a] [t] [t] [|] [4] [0] [=] [1] |
| buy 230 axp market | [5] [4] [=] [1] [|] [3] [8] [=] [2] [3] [0] [|] [5] [5] [=] [a] [x] [p] [|] [4] [0] [=] [1] |
| buy 226 ba market | [5] [4] [=] [1] [|] [3] [8] [=] [2] [2] [6] [|] [5] [5] [=] [b] [a] [|] [4] [0] [=] [1] |
| buy 221 bac market | [5] [4] [=] [1] [|] [3] [8] [=] [2] [2] [1] [|] [5] [5] [=] [b] [a] [c] [|] [4] [0] [=] [1] |
| buy 232 cat market | [5] [4] [=] [1] [|] [3] [8] [=] [2] [3] [2] [|] [5] [5] [=] [c] [a] [t] [|] [4] [0] [=] [1] |
| buy 228 csco market | [5] [4] [=] [1] [|] [3] [8] [=] [2] [2] [8] [|] [5] [5] [=] [c] [s] [c] [o] [|] [4] [0] [=] [1] |
| buy 225 cvx market | [5] [4] [=] [1] [|] [3] [8] [=] [2] [2] [5] [|] [5] [5] [=] [c] [v] [x] [|] [4] [0] [=] [1] |
| buy 224 dd market | [5] [4] [=] [1] [|] [3] [8] [=] [2] [2] [4] [|] [5] [5] [=] [d] [d] [|] [4] [0] [=] [1] |
| buy 224 dis market | [5] [4] [=] [1] [|] [3] [8] [=] [2] [2] [4] [|] [5] [5] [=] [d] [i] [s] [|] [4] [0] [=] [1] |

TABLE 1-continued

| PlainText | FIX Protocol | | | | | | | | | | | | | | | | | | | | |
|---|---|---|---|---|---|---|---|---|---|---|---|---|---|---|---|---|---|---|---|---|---|
| buy 222 ge market | [5] | [4] | [=] | [1] | [|] | [3] | [8] | [=] | [2] | [2] | [2] | [|] | [5] | [5] | [=] | [g] | [e] | [|] | [4] | [0] | [=] | [1] |
| buy 223 hd market | [5] | [4] | [=] | [1] | [|] | [3] | [8] | [=] | [2] | [2] | [3] | [|] | [5] | [5] | [=] | [h] | [d] | [|] | [4] | [0] | [=] | [1] |
| buy 225 hpq market | [5] | [4] | [=] | [1] | [|] | [3] | [8] | [=] | [2] | [2] | [5] | [|] | [5] | [5] | [=] | [h] | [p] | [q] | [|] | [4] | [0] | [=] | [1] |
| buy 228 ibm market | [5] | [4] | [=] | [1] | [|] | [3] | [8] | [=] | [2] | [2] | [8] | [|] | [5] | [5] | [=] | [i] | [b] | [m] | [|] | [4] | [0] | [=] | [1] |
| buy 222 intc market | [5] | [4] | [=] | [1] | [|] | [3] | [8] | [=] | [2] | [2] | [2] | [|] | [5] | [5] | [=] | [i] | [n] | [t] | [c] | [|] | [4] | [0] | [=] | [1] |
| buy 227 jnj market | [5] | [4] | [=] | [1] | [|] | [3] | [8] | [=] | [2] | [2] | [7] | [|] | [5] | [5] | [=] | [j] | [n] | [j] | [|] | [4] | [0] | [=] | [1] |
| buy 225 jpm market | [5] | [4] | [=] | [1] | [|] | [3] | [8] | [=] | [2] | [2] | [5] | [|] | [5] | [5] | [=] | [j] | [p] | [m] | [|] | [4] | [0] | [=] | [1] |
| buy 224 kft market | [5] | [4] | [=] | [1] | [|] | [3] | [8] | [=] | [2] | [2] | [4] | [|] | [5] | [5] | [=] | [k] | [f] | [t] | [|] | [4] | [0] | [=] | [1] |
| buy 233 ko market | [5] | [4] | [=] | [1] | [|] | [3] | [8] | [=] | [2] | [3] | [3] | [|] | [5] | [5] | [=] | [k] | [o] | [|] | [4] | [0] | [=] | [1] |
| buy 224 mcd market | [5] | [4] | [=] | [1] | [|] | [3] | [8] | [=] | [2] | [2] | [4] | [|] | [5] | [5] | [=] | [m] | [c] | [d] | [|] | [4] | [0] | [=] | [1] |
| buy 200 mmm market | [5] | [4] | [=] | [1] | [|] | [3] | [8] | [=] | [2] | [0] | [0] | [|] | [5] | [5] | [=] | [m] | [m] | [m] | [|] | [4] | [0] | [=] | [1] |
| buy 225 mrk market | [5] | [4] | [=] | [1] | [|] | [3] | [8] | [=] | [2] | [2] | [5] | [|] | [5] | [5] | [=] | [m] | [r] | [k] | [|] | [4] | [0] | [=] | [1] |
| buy 227 msft market | [5] | [4] | [=] | [1] | [|] | [3] | [8] | [=] | [2] | [2] | [7] | [|] | [5] | [5] | [=] | [m] | [s] | [f] | [t] | [|] | [4] | [0] | [=] | [1] |
| buy 221 pfe market | [5] | [4] | [=] | [1] | [|] | [3] | [8] | [=] | [2] | [2] | [1] | [|] | [5] | [5] | [=] | [p] | [f] | [e] | [|] | [4] | [0] | [=] | [1] |
| buy 200 pg market | [5] | [4] | [=] | [1] | [|] | [3] | [8] | [=] | [2] | [0] | [0] | [|] | [5] | [5] | [=] | [p] | [g] | [|] | [4] | [0] | [=] | [1] |
| buy 223 trv market | [5] | [4] | [=] | [1] | [|] | [3] | [8] | [=] | [2] | [2] | [3] | [|] | [5] | [5] | [=] | [t] | [r] | [v] | [|] | [4] | [0] | [=] | [1] |
| buy 227 utx market | [5] | [4] | [=] | [1] | [|] | [3] | [8] | [=] | [2] | [2] | [7] | [|] | [5] | [5] | [=] | [u] | [t] | [x] | [|] | [4] | [0] | [=] | [1] |
| buy 226 vz market | [5] | [4] | [=] | [1] | [|] | [3] | [8] | [=] | [2] | [2] | [6] | [|] | [5] | [5] | [=] | [v] | [z] | [|] | [4] | [0] | [=] | [1] |
| buy 224 wmt market | [5] | [4] | [=] | [1] | [|] | [3] | [8] | [=] | [2] | [2] | [4] | [|] | [5] | [5] | [=] | [w] | [m] | [t] | [|] | [4] | [0] | [=] | [1] |
| buy 227 xom market | [5] | [4] | [=] | [1] | [|] | [3] | [8] | [=] | [2] | [2] | [7] | [|] | [5] | [5] | [=] | [x] | [o] | [m] | [1] | [4] | [0] | [=] | [1] |

TABLE 2

| PlainText | First-Order Entropy Coding | | | | | | | | | | | | | | | | | | | | |
|---|---|---|---|---|---|---|---|---|---|---|---|---|---|---|---|---|---|---|---|---|---|
| sell short 6 @ym# market | [s] | [e] | [l] | [l] | [s] | [h] | [o] | [r] | [t] | [,] | [6] | [,] | [@] | [y] | [m] | [#] | [,] | [m] | [a] | [r] | [k] | [e] | [t] |
| buy 224 aa market | [b] | [u] | [y] | [,] | [2] | [2] | [4] | [,] | [a] | [a] | [,] | [m] | [a] | [r] | [k] | [e] | [t] |
| buy 214 att market | [b] | [u] | [y] | [,] | [2] | [1] | [4] | [,] | [a] | [t] | [t] | [,] | [m] | [a] | [r] | [k] | [e] | [t] |
| buy 230 axp market | [b] | [u] | [y] | [,] | [2] | [3] | [0] | [,] | [a] | [x] | [p] | [,] | [m] | [a] | [r] | [k] | [e] | [t] |
| buy 226 ba market | [b] | [u] | [y] | [,] | [2] | [2] | [6] | [,] | [b] | [a] | [,] | [m] | [a] | [r] | [k] | [e] | [t] |
| buy 221 bac market | [b] | [u] | [y] | [,] | [2] | [2] | [1] | [,] | [b] | [a] | [c] | [,] | [m] | [a] | [r] | [k] | [e] | [t] |
| buy 232 cat market | [b] | [u] | [y] | [,] | [2] | [3] | [2] | [,] | [c] | [a] | [t] | [,] | [m] | [a] | [r] | [k] | [e] | [t] |
| buy 228 csco market | [b] | [u] | [y] | [,] | [2] | [2] | [8] | [,] | [c] | [s] | [c] | [o] | [,] | [m] | [a] | [r] | [k] | [e] | [t] |
| buy 225 cvx market | [b] | [u] | [y] | [,] | [2] | [2] | [5] | [,] | [c] | [v] | [x] | [,] | [m] | [a] | [r] | [k] | [e] | [t] |
| buy 224 dd market | [b] | [u] | [y] | [,] | [2] | [2] | [4] | [,] | [d] | [d] | [,] | [m] | [a] | [r] | [k] | [e] | [t] |
| buy 224 dis market | [b] | [u] | [y] | [,] | [2] | [2] | [4] | [,] | [d] | [i] | [s] | [,] | [m] | [a] | [r] | [k] | [e] | [t] |
| buy 222 ge market | [b] | [u] | [y] | [,] | [2] | [2] | [2] | [,] | [g] | [e] | [,] | [m] | [a] | [r] | [k] | [e] | [t] |
| buy 223 hd market | [b] | [u] | [y] | [,] | [2] | [2] | [3] | [,] | [h] | [d] | [,] | [m] | [a] | [r] | [k] | [e] | [t] |
| buy 225 hpq market | [b] | [u] | [y] | [,] | [2] | [2] | [5] | [,] | [h] | [p] | [q] | [,] | [m] | [a] | [r] | [k] | [e] | [t] |
| buy 228 ibm market | [b] | [u] | [y] | [,] | [2] | [2] | [8] | [,] | [i] | [b] | [m] | [,] | [m] | [a] | [r] | [k] | [e] | [t] |
| buy 222 intc market | [b] | [u] | [y] | [,] | [2] | [2] | [,] | [i] | [n] | [t] | [c] | [,] | [m] | [a] | [r] | [k] | [e] | [t] |
| buy 227 jnj market | [b] | [u] | [y] | [,] | [2] | [2] | [7] | [,] | [j] | [n] | [j] | [,] | [m] | [a] | [r] | [k] | [e] | [t] |
| buy 225 jpm market | [b] | [u] | [y] | [,] | [2] | [2] | [5] | [,] | [j] | [p] | [m] | [,] | [m] | [a] | [r] | [k] | [e] | [t] |
| buy 224 kft market | [b] | [u] | [y] | [,] | [2] | [2] | [4] | [,] | [k] | [f] | [t] | [,] | [m] | [a] | [r] | [k] | [e] | [t] |
| buy 233 ko market | [b] | [u] | [y] | [,] | [2] | [3] | [3] | [,] | [k] | [o] | [,] | [m] | [a] | [r] | [k] | [e] | [t] |
| buy 224 mcd market | [b] | [u] | [y] | [,] | [2] | [2] | [4] | [,] | [m] | [c] | [d] | [,] | [m] | [a] | [r] | [k] | [e] | [t] |
| buy 200 mmm market | [b] | [u] | [y] | [,] | [2] | [0] | [0] | [,] | [m] | [m] | [m] | [,] | [m] | [a] | [r] | [k] | [e] | [t] |
| buy 225 mrk market | [b] | [u] | [y] | [,] | [2] | [2] | [5] | [,] | [m] | [r] | [k] | [,] | [m] | [a] | [r] | [k] | [e] | [t] |
| buy 227 msft market | [b] | [u] | [y] | [,] | [2] | [2] | [7] | [,] | [m] | [s] | [f] | [t] | [,] | [m] | [a] | [r] | [k] | [e] | [t] |
| buy 221 pfe market | [b] | [u] | [y] | [,] | [2] | [2] | [1] | [,] | [p] | [f] | [e] | [,] | [m] | [a] | [r] | [k] | [e] | [t] |
| buy 200 pg market | [b] | [u] | [y] | [,] | [2] | [0] | [0] | [,] | [p] | [g] | [,] | [m] | [a] | [r] | [k] | [e] | [t] |
| buy 223 try market | [b] | [u] | [y] | [,] | [2] | [2] | [3] | [,] | [t] | [r] | [v] | [,] | [m] | [a] | [r] | [k] | [e] | [t] |
| buy 227 utx market | [b] | [u] | [y] | [,] | [2] | [2] | [7] | [,] | [u] | [t] | [x] | [,] | [m] | [a] | [r] | [k] | [e] | [t] |
| buy 226 vz market | [b] | [u] | [y] | [,] | [2] | [2] | [6] | [,] | [v] | [z] | [,] | [m] | [a] | [r] | [k] | [e] | [t] |
| buy 224 wmt market | [b] | [u] | [y] | [,] | [2] | [2] | [4] | [,] | [w] | [m] | [t] | [,] | [m] | [a] | [r] | [k] | [e] | [t] |
| buy 227 xom market | [o] | [u] | [y] | [,] | [2] | [2] | [7] | [,] | [x] | [o] | [m] | [,] | [m] | [a] | [r] | [k] | [e] | [t] |

TABLE 3

| PlainText | Second-Order Entropy Coding |
|---|---|
| sell short 6 @ym# market | [sellshort] [6] [@ym#] [market] |
| buy 224 aa market | [buy] [224] [aa] [market] |
| buy 214 att market | [buy] [214] [att] [market] |
| buy 230 axp market | [buy] [230] [axp] [market] |
| buy 226 ba market | [buy] [226] [ba] [market] |
| buy 221 bac market | [buy] [221] [bac] [market] |
| buy 232 cat market | [buy] [232] [cat] [market] |
| buy 228 csco market | [buy] [228] [csco] [market] |
| buy 225 cvx market | [buy] [225] [cvx] [market] |
| buy 224 dd market | [buy] [224] [dd] [market] |
| buy 224 dis market | [buy] [224] [dis] [market] |
| buy 222 ge market | [buy] [222] [ge] [market] |
| buy 223 hd market | [buy] [223] [hd] [market] |
| buy 225 hpq market | [buy] [225] [hpq] [market] |
| buy 228 ibm market | [buy] [228] [ibm] [market] |
| buy 222 intc market | [buy] [222] [intc] [market] |
| buy 227 jnj market | [buy] [227] [jnj] [market] |
| buy 225 jpm market | [buy] [225] [jpm] [market] |
| buy 224 kft market | [buy] [224] [kft] [market] |
| buy 233 ko market | [buy] [233] [ko] [market] |

TABLE 3-continued

| PlainText | Second-Order Entropy Coding |
|---|---|
| buy 224 mcd market | [buy] [224] [mcd] [market] |
| buy 200 mmm market | [buy] [200] [mmm] [market] |
| buy 225 mrk market | [buy] [225] [mrk] [market] |
| buy 227 msft market | [buy] [227] [msft] [market] |
| buy 221 pfe market | [buy] [221] [pfe] [market] |
| buy 200 pg market | [buy] [200] [pg] [market] |
| buy 223 trv market | [buy] [223] [trv] [market] |
| buy 227 utx market | [buy] [227] [utx] [market] |
| buy 226 vz market | [buy] [226] [vz] [market] |
| buy 224 wmt market | [buy] [224] [wmt] [market] |
| buy 227 xom market | [buy] [227] [xom] [market] |

The FIX protocol coding efficiency (61.714%) is the first order entropy (4.2669116; see Table 5) divided by the average code length of 7 bits/character. The message length is 709 characters×7 bits/character, which equals 4,963 bits.

In accordance with the principles of the present invention, a custom coding scheme is prepared by determining the number of times (Qty) that a order-unit appears in a financial message or setoff financial messages, and then determining the p-value of each order-unit. The entropy of the order(s) is given by $-p \lg p$. A compression coding algorithm, such as the Huffman Algorithm is employed to determine the coding of the order-units based upon their p-value (e.g., frequency, weighting, or other scalar metric). In brief, a tree is created in which order-units having higher p-values are assigned to branches closest to the trunk, while order-units having lower p-values are progressively assigned to tree branches located further from the trunk.

Figure 2:
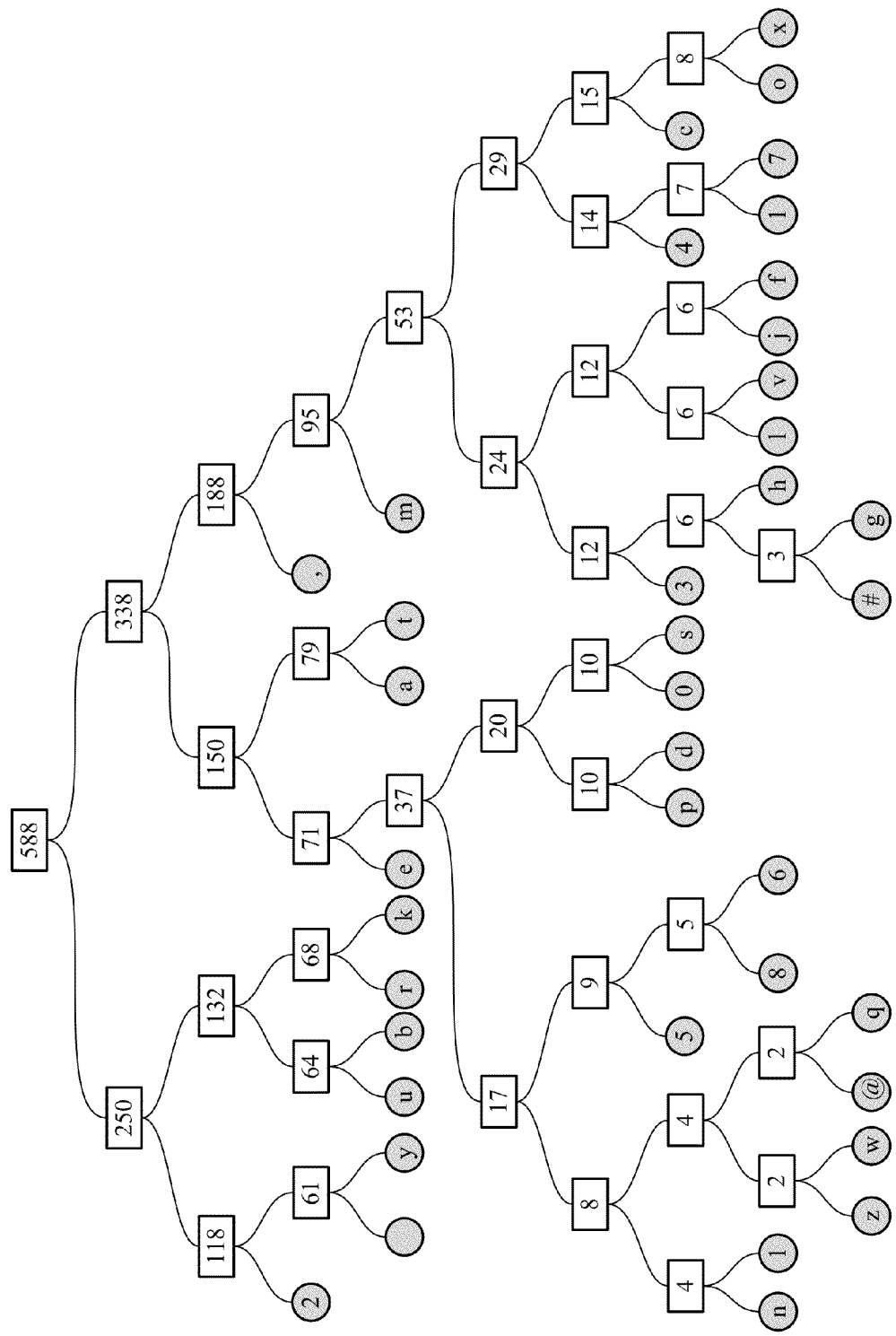
FIG. 2 shows the results of the use of the Huffman algorithm on the set of hypothetical financial messages in Table 2 as a coding tree. Symbols used in the coding scheme are shown in filled circles, and frequencies are shown in open rectangles. The sum of the frequencies for each branch equals the frequency of the next highest branch (e.g., the sum of the frequencies of symbols "a" and "t" in the hypothetical set of orders is 79).

The results of the use of the Huffman algorithm on the set of financial messages in Table 2 (first order entropy coding scheme) are shown graphically as a tree in FIG. 2. One means for implementing the Huffman algorithm is to employ huffman.jar software to generate the tree. Such software is widely available on the internet and is known to those of ordinary skill in the art. The use of the algorithm provides a set of equivalent solutions, any one of which will be capable of providing a unique coding to each symbol. The coding values may be deduced from FIG. 2 by setting a value of "1" for each step to the right and a value of "0" for each step to the left. Thus, for example, the symbol "m" is positioned to require three sequential steps to the left, and has a coding of 000; the symbol "2" is positioned to require the steps left, then right, and then left, and accordingly has a coding of 010. Table 4 shows the symbols, the deduced coding and the quantity of bits attained through the use of the analysis (the term "[paragraph]" denotes a command to start a new line or paragraph).

TABLE 4

Illustrative First-Order Entropy Custom Coding Scheme

| Symbol | Coding | Qty of Bits |
|---|---|---|
| , | 110 | 3 |
| 2 | 000 | 3 |
| m | 1110 | 4 |
| t | 1011 | 4 |
| a | 1010 | 4 |
| r | 0110 | 4 |
| k | 0111 | 4 |
| e | 1000 | 4 |
| b | 0101 | 4 |
| y | 0011 | 4 |
| u | 0100 | 4 |
| [paragraph] | 0010 | 4 |
| 4 | 1111100 | 7 |
| c | 1111110 | 7 |
| 3 | 1111000 | 7 |
| p | 1001100 | 7 |
| d | 1001101 | 7 |
| 0 | 1001110 | 7 |
| s | 1001111 | 7 |
| 5 | 1001010 | 7 |
| 7 | 11111011 | 8 |
| o | 11111110 | 8 |
| x | 11111111 | 8 |
| 6 | 10010111 | 8 |
| h | 11110011 | 8 |
| l | 11110100 | 8 |
| v | 11110101 | 8 |
| j | 11110110 | 8 |
| f | 11110111 | 8 |
| i | 11111010 | 8 |
| n | 10010000 | 8 |
| 1 | 10010001 | 8 |
| 8 | 10010110 | 8 |
| g | 111100101 | 9 |
| z | 100100100 | 9 |
| w | 100100101 | 9 |
| @ | 100100110 | 9 |
| q | 100100111 | 9 |
| # | 111100100 | 9 |

The calculated first-order entropy of the list of financial messages is shown in Table 5.

TABLE 5

Efficiency and Message Size of Illustrative First-Order Entropy Custom Coding Scheme

| Symbol | Qty | p | −plgp | Qty Of Bits | p Weighted Bits | Total Bits In Msg |
|---|---|---|---|---|---|---|
| , | 93 | 0.1581633 | 0.4207955 | 3 | 0.4744898 | 279 |
| 2 | 57 | 0.0969388 | 0.3263718 | 3 | 0.29081633 | 171 |
| m | 42 | 0.0714286 | 0.2719539 | 4 | 0.28571429 | 168 |
| t | 41 | 0.0697279 | 0.2679029 | 4 | 0.27891156 | 164 |
| a | 38 | 0.0646259 | 0.2553849 | 4 | 0.2585034 | 152 |
| r | 34 | 0.0578231 | 0.2377808 | 4 | 0.23129252 | 136 |
| k | 34 | 0.0578231 | 0.2377808 | 4 | 0.23129252 | 136 |
| e | 34 | 0.0578231 | 0.2377808 | 4 | 0.23129252 | 136 |
| b | 33 | 0.0561224 | 0.2332044 | 4 | 0.22448980 | 132 |
| y | 31 | 0.0527211 | 0.2238261 | 4 | 0.21088435 | 124 |
| u | 31 | 0.0527211 | 0.2238261 | 4 | 0.21088435 | 124 |
| [paragraph] | 30 | 0.0510204 | 0.2190195 | 4 | 0.20408163 | 120 |
| 4 | 7 | 0.0119048 | 0.0760990 | 7 | 0.08333333 | 49 |
| c | 7 | 0.0119048 | 0.0760990 | 7 | 0.08333333 | 49 |
| 3 | 6 | 0.0102041 | 0.0674970 | 7 | 0.07142857 | 42 |
| p | 5 | 0.0085034 | 0.0584842 | 7 | 0.05952381 | 35 |

TABLE 5-continued

Efficiency and Message Size of Illustrative First-Order Entropy Custom Coding Scheme

| Symbol | Qty | p | −plgp | Qty Of Bits | p Weighted Bits | Total Bits In Msg |
|---|---|---|---|---|---|---|
| d | 5 | 0.0085034 | 0.0584842 | 7 | 0.05952381 | 35 |
| 0 | 5 | 0.0085034 | 0.0584842 | 7 | 0.05952381 | 35 |
| s | 5 | 0.0085034 | 0.0584842 | 7 | 0.05952381 | 35 |
| 5 | 4 | 0.0068027 | 0.0489774 | 7 | 0.04761905 | 28 |
| 7 | 4 | 0.0068027 | 0.0489774 | 8 | 0.05442177 | 32 |
| o | 4 | 0.0068027 | 0.0489774 | 8 | 0.05442177 | 32 |
| x | 4 | 0.0068027 | 0.0489774 | 8 | 0.05442177 | 32 |
| 6 | 3 | 0.0051020 | 0.0388506 | 8 | 0.04081633 | 24 |
| h | 3 | 0.0051020 | 0.0388506 | 8 | 0.04081633 | 24 |
| 1 | 3 | 0.0051020 | 0.0388506 | 8 | 0.04081633 | 24 |
| v | 3 | 0.0051020 | 0.0388506 | 8 | 0.04081633 | 24 |
| j | 3 | 0.0051020 | 0.0388506 | 8 | 0.04081633 | 24 |
| f | 3 | 0.0051020 | 0.0388506 | 8 | 0.04081633 | 24 |
| i | 3 | 0.0051020 | 0.0388506 | 8 | 0.04081633 | 24 |
| n | 2 | 0.0034014 | 0.0278900 | 8 | 0.02721088 | 16 |
| l | 2 | 0.0034014 | 0.0278900 | 8 | 0.02721088 | 16 |
| 8 | 2 | 0.0034014 | 0.0278900 | 8 | 0.02721088 | 16 |
| g | 2 | 0.0034014 | 0.0278900 | 9 | 0.03061224 | 18 |
| z | 1 | 0.0017007 | 0.0156457 | 9 | 0.01530612 | 9 |
| w | 1 | 0.0017007 | 0.0156457 | 9 | 0.01530612 | 9 |
| @ | 1 | 0.0017007 | 0.0156457 | 9 | 0.01530612 | 9 |
| q | 1 | 0.0017007 | 0.0156457 | 9 | 0.01530612 | 9 |
| # | 1 | 0.0017007 | 0.0156457 | 9 | 0.01530612 | 9 |
| Total | 588 | 1.0000 | Entropy: 4.2669116 | | Avg. Code Length: 4.29421769 | Message Length (in bits): 2525 |

The first order entropy of the list of orders is 4.2669116. The Huffman coding method creates a custom coding scheme that has an average code length of 4.294421769 bits per character. This code's efficiency (entropy/avg code length) is 4.2669116/4.294421769=99.36412%.

Figure 3A:
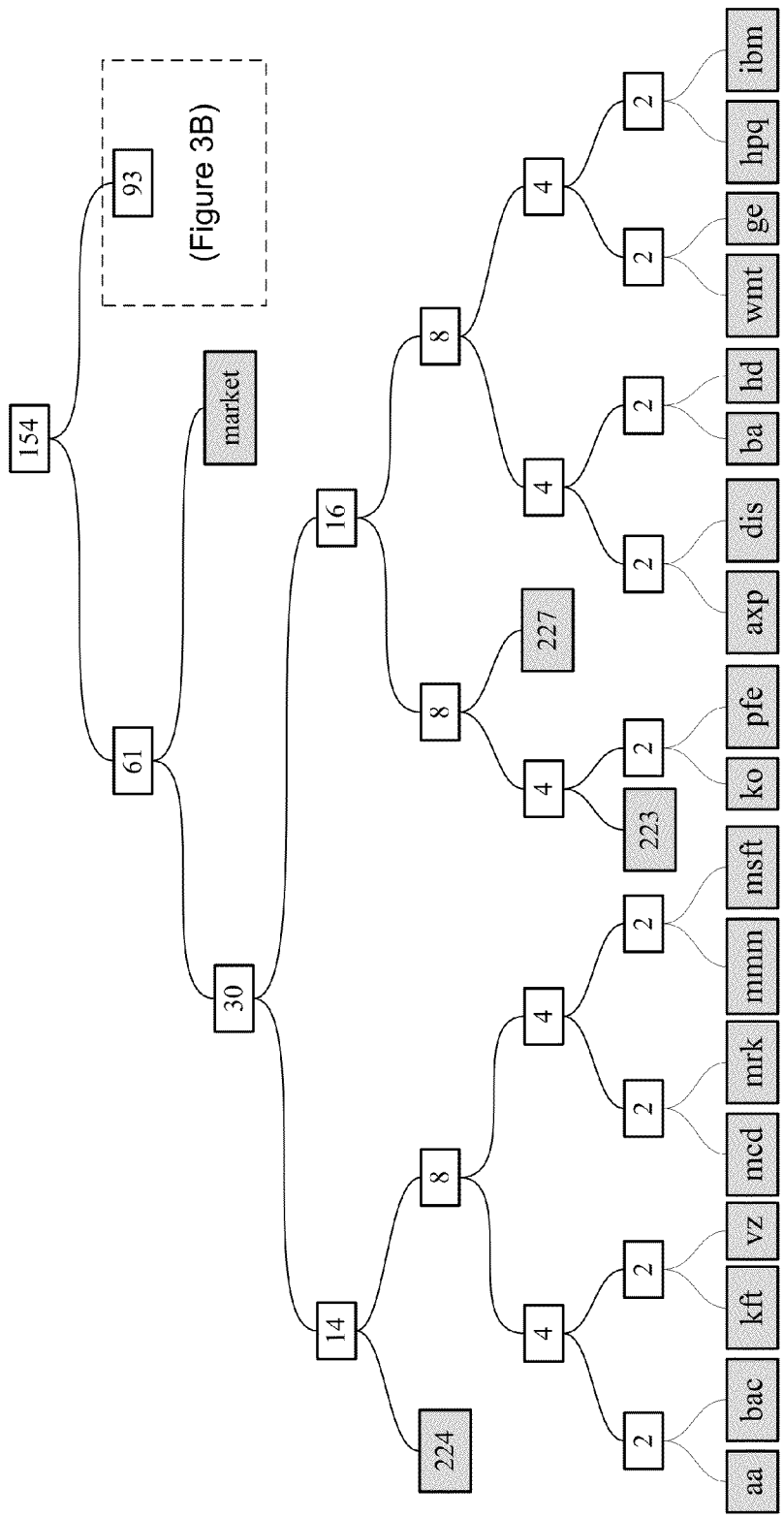
FIGS. 3A and 3B shows the results of the use of the Huffman algorithm on the set of hypothetical financial messages in Table 3 as a coding tree. Words used in the coding scheme are shown as letters in filled rectangles, and frequencies are shown in open rectangles. The sum of the frequencies for each branch equals the frequency of the next highest branch (e.g., the sum of the frequencies of symbols "[paragraph]" and "buy" in the hypothetical set of orders is 60 (FIG. 3B).
Figure 3B:
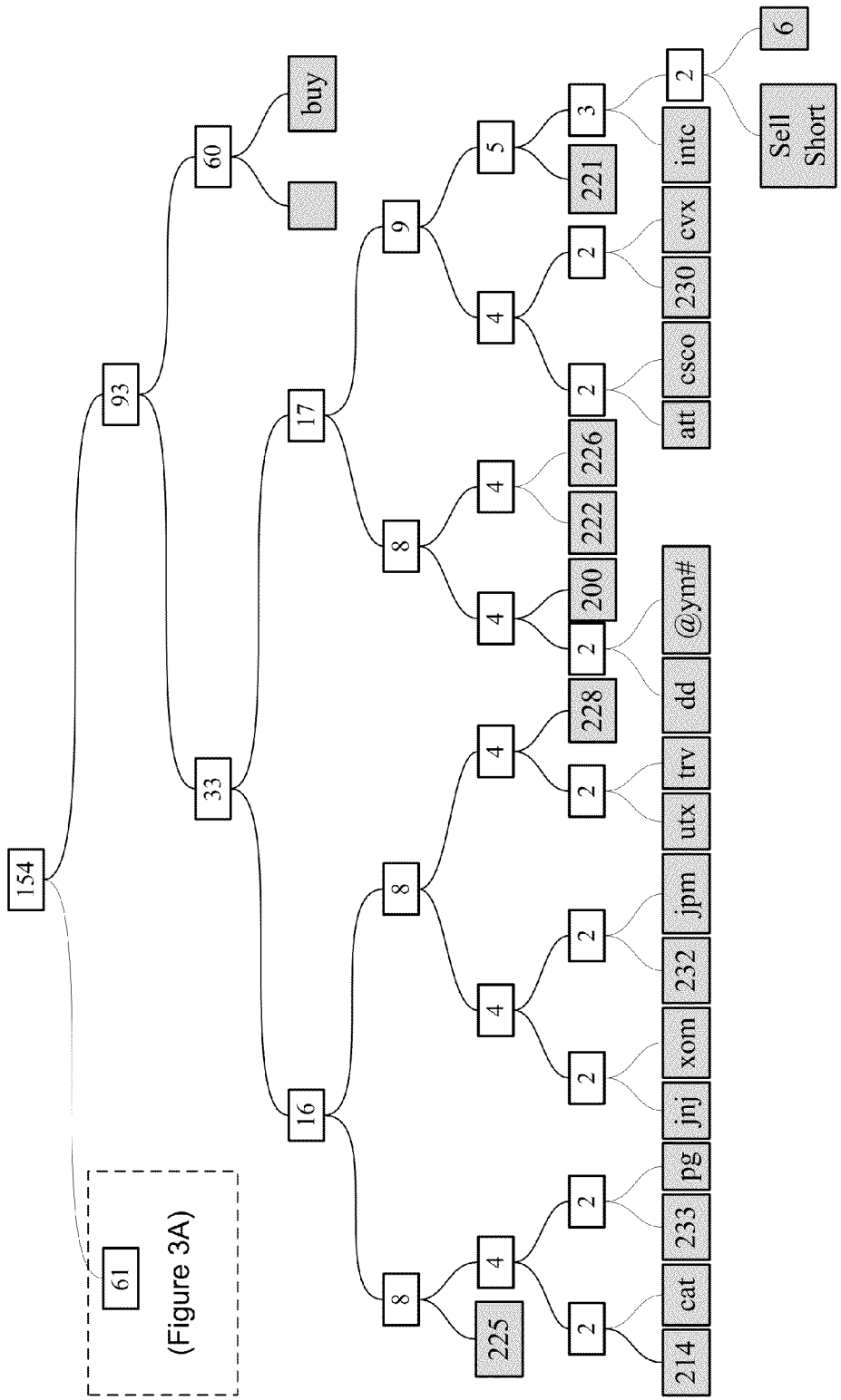

The results of the use of the Huffman algorithm on the set of financial messages in Table 3 using words as order-units (second-order entropy coding scheme) are shown graphically as a tree in FIGS. 3A and 3B. As described above, the use of the algorithm provides a set of equivalent solutions, any one of which will be capable of providing a unique coding to each order-unit. The coding values may be deduced from FIGS. 3A and 3B by setting a value of "1" for each step to the right and a value of "0" for each step to the left. Thus, for example, the word "buy" is positioned to require three sequential steps to the right (FIG. 3B), and has a coding of 111; the word "market" is positioned to require the steps left, and then left, and accordingly has a coding of 01. Table 6 shows the words of the second-order coding scheme, the deduced coding and the quantity of bits attained through the use of the analysis.

TABLE 6

Illustrative Second-Order Entropy Custom Coding Scheme

| Word | Coding | Qty of Bits |
|---|---|---|
| market | 01 | 2 |
| [paragraph] | 110 | 3 |
| buy | 111 | 3 |
| 224 | 0000 | 4 |
| 227 | 00101 | 5 |
| 225 | 10000 | 5 |
| 223 | 001000 | 6 |
| 228 | 100111 | 6 |
| 200 | 101001 | 6 |
| 222 | 101010 | 6 |
| 226 | 101011 | 6 |
| 221 | 1011110 | 7 |

TABLE 6-continued

Illustrative Second-Order Entropy Custom Coding Scheme

| Word | Coding | Qty of Bits |
|---|---|---|
| aa | 0001000 | 7 |
| bac | 0001001 | 7 |
| kft | 0001010 | 7 |
| vz | 0001011 | 7 |
| mcd | 0001100 | 7 |
| mrk | 0001101 | 7 |
| mmm | 0001110 | 7 |
| msft | 0001111 | 7 |
| ko | 0010010 | 7 |
| pfe | 0010011 | 7 |
| axp | 0011000 | 7 |
| dis | 0011001 | 7 |
| ba | 0011010 | 7 |
| hd | 0011011 | 7 |
| wmt | 0011100 | 7 |
| ge | 0011101 | 7 |
| hpq | 0011110 | 7 |
| ibm | 0011111 | 7 |
| 214 | 1000100 | 7 |
| cat | 1000101 | 7 |
| 233 | 1000110 | 7 |
| pg | 1000111 | 7 |
| jnj | 1001000 | 7 |
| xom | 1001001 | 7 |
| 232 | 1001010 | 7 |
| jpm | 1001011 | 7 |
| utx | 1001100 | 7 |
| trv | 1001101 | 7 |
| dd | 1010000 | 7 |
| @ym# | 1010001 | 7 |
| att | 1011000 | 7 |
| csco | 1011001 | 7 |
| 230 | 1011010 | 7 |
| cvx | 1011011 | 7 |
| intc | 1011110 | 7 |
| sell short | 10111110 | 8 |
| 6 | 10111111 | 8 |

The calculated second order entropy of the list of financial messages is calculated from Table 7.

TABLE 7

Efficiency and Message Size of Illustrative Second-Order Entropy Custom Coding Scheme

| Word | Qty | p | −plgp | Qty Of Bits | p Weighted Bits | Total Bits In Msg |
|---|---|---|---|---|---|---|
| market | 31 | 0.2012987 | 0.4655214 | 2 | 0.40259740 | 62 |
| [paragraph] | 30 | 0.1948052 | 0.4597200 | 3 | 0.58441558 | 90 |
| buy | 30 | 0.1948052 | 0.4597200 | 3 | 0.58441558 | 90 |
| 224 | 6 | 0.0389610 | 0.1824087 | 4 | 0.15584416 | 24 |
| 227 | 4 | 0.0259740 | 0.1367997 | 5 | 0.12987013 | 20 |
| 225 | 4 | 0.0259740 | 0.1367997 | 5 | 0.12987013 | 20 |
| 223 | 2 | 0.0129870 | 0.0813868 | 6 | 0.07792208 | 12 |
| 228 | 2 | 0.0129870 | 0.0813868 | 6 | 0.07792208 | 12 |
| 200 | 2 | 0.0129870 | 0.0813868 | 6 | 0.07792208 | 12 |
| 222 | 2 | 0.0129870 | 0.0813868 | 6 | 0.07792208 | 12 |
| 226 | 2 | 0.0129870 | 0.0813868 | 6 | 0.07792208 | 12 |
| 221 | 2 | 0.0129870 | 0.0813868 | 6 | 0.07792208 | 12 |
| aa | 1 | 0.0064935 | 0.0471869 | 7 | 0.04545455 | 7 |
| bac | 1 | 0.0064935 | 0.0471869 | 7 | 0.04545455 | 7 |
| kft | 1 | 0.0064935 | 0.0471869 | 7 | 0.04545455 | 7 |
| vz | 1 | 0.0064935 | 0.0471869 | 7 | 0.04545455 | 7 |
| mcd | 1 | 0.0064935 | 0.0471869 | 7 | 0.04545455 | 7 |
| mrk | 1 | 0.0064935 | 0.0471869 | 7 | 0.04545455 | 7 |
| mmm | 1 | 0.0064935 | 0.0471869 | 7 | 0.04545455 | 7 |
| msft | 1 | 0.0064935 | 0.0471869 | 7 | 0.04545455 | 7 |
| ko | 1 | 0.0064935 | 0.0471869 | 7 | 0.04545455 | 7 |
| pfe | 1 | 0.0064935 | 0.0471869 | 7 | 0.04545455 | 7 |
| axp | 1 | 0.0064935 | 0.0471869 | 7 | 0.04545455 | 7 |
| dis | 1 | 0.0064935 | 0.0471869 | 7 | 0.04545455 | 7 |
| ba | 1 | 0.0064935 | 0.0471869 | 7 | 0.04545455 | 7 |
| hd | 1 | 0.0064935 | 0.0471869 | 7 | 0.04545455 | 7 |
| wmt | 1 | 0.0064935 | 0.0471869 | 7 | 0.04545455 | 7 |
| ge | 1 | 0.0064935 | 0.0471869 | 7 | 0.04545455 | 7 |
| hpq | 1 | 0.0064935 | 0.0471869 | 7 | 0.04545455 | 7 |
| ibm | 1 | 0.0064935 | 0.0471869 | 7 | 0.04545455 | 7 |
| 214 | 1 | 0.0064935 | 0.0471869 | 7 | 0.04545455 | 7 |
| cat | 1 | 0.0064935 | 0.0471869 | 7 | 0.04545455 | 7 |
| 233 | 1 | 0.0064935 | 0.0471869 | 7 | 0.04545455 | 7 |
| pg | 1 | 0.0064935 | 0.0471869 | 7 | 0.04545455 | 7 |
| jnj | 1 | 0.0064935 | 0.0471869 | 7 | 0.04545455 | 7 |
| xom | 1 | 0.0064935 | 0.0471869 | 7 | 0.04545455 | 7 |
| 232 | 1 | 0.0064935 | 0.0471869 | 7 | 0.04545455 | 7 |
| jpm | 1 | 0.0064935 | 0.0471869 | 7 | 0.04545455 | 7 |
| utx | 1 | 0.0064935 | 0.0471869 | 7 | 0.04545455 | 7 |
| trv | 1 | 0.0064935 | 0.0471869 | 7 | 0.04545455 | 7 |
| dd | 1 | 0.0064935 | 0.0471869 | 7 | 0.04545455 | 7 |
| @ym# | 1 | 0.0064935 | 0.0471869 | 7 | 0.04545455 | 7 |
| att | 1 | 0.0064935 | 0.0471869 | 7 | 0.04545455 | 7 |
| csco | 1 | 0.0064935 | 0.0471869 | 7 | 0.04545455 | 7 |
| 230 | 1 | 0.0064935 | 0.0471869 | 7 | 0.04545455 | 7 |
| cvx | 1 | 0.0064935 | 0.0471869 | 7 | 0.04545455 | 7 |
| intc | 1 | 0.0064935 | 0.0471869 | 7 | 0.04545455 | 7 |
| sell short | 1 | 0.0064935 | 0.0471869 | 8 | 0.05194805 | 8 |
| 6 | 1 | 0.0064935 | 0.0471869 | 8 | 0.05194805 | 8 |
| Total | 154 | 1.0000 | Entropy: 4.0752067 | | Avg. Code Length: 4.14935065 | Message length in bits: 639 |

The second order entropy of the list of orders is 4.0752067. The Huffman coding method creates a custom coding scheme that has an average code length of 4.14935065 bits per character. This code's efficiency (entropy/avg code length) is 4.0752067/4.14935065=98.21312%.

In sum, through the use of the methods of the present invention, the number of bits needed to communicate the set of illustrative messages shown in Table 1-3 has been decreased from 4,963 bits to 2,525 bits (for a first-order entropy coding scheme) to 639 bits (for a second-order entropy coding scheme). Such a reduction in message size provides multiple advantages. For example, since messages are subject to transmission problems (lost packets, etc.), decreasing the size of the message decreases the probability of a transmission error. Additionally, decreasing the message size permits the entire encoded message to be received (and acted upon) more rapidly than an unencoded message conveying the same information. In circumstances (such as event arbitrage) in which speed of execution is important, the present invention provides a significant advantage over prior methods. Moreover, decreasing the message size permits more messages to be transmitted per second, thus increasing effective bandwidth and carrying capacity of the transmission lines.

27

Example 2

Illustrative System and Methods for Clients Who Send Orders with Randomly Distributed Variables and Order-Units The enhanced efficiency of data exchanges provided by the present invention is illustrated by effecting a simple order to purchase 100 shares of stock in Company A, having a Market Exchange Symbol of "aaa".

Using the FIX protocol, a message "m=FIX4.4|n=aaa|w=100|x=market|z=buy" is employed to communicate this message (which m, n, w, x and z are FIX tags that indicate the version of the FIX protocol being used, the stock symbol, the type of order (market or limit), action (buy or sell). For this simplified message of 35 characters, an ASCII code of (35×8 bits=) 280 bits is required. An actual FIX protocol message would in fact be longer than the simplified message.

In accordance with the present invention, a custom compression technique is employed to provide a coding scheme. The conveyed message is the same: "buy 400 aaa market." The space delineators are removed to form "buy400aaamarket". The frequencies with which the individual letters of the message are calculated (e.g. 4 a's, 1 b, 1 e, etc.). A compression algorithm, e.g., the Huffman algorithm, is employed to create a coding scheme using the calculated frequencies. The resultant binary designations for the code are shown in the Table 8.

TABLE 8

| Coding Scheme | |
|---|---|
| Plain Text | Binary Value |
| a | 01 |
| 0 | 001 |
| m | 000 |
| 4 | 1000 |
| r | 1001 |
| t | 1010 |
| k | 1011 |
| b | 1100 |
| u | 1101 |
| e | 1110 |
| y | 1111 |

The resultant code table would comprise additional rows if the message contained additional order-units or might be expected to contain additional order-units in the future. In a preferred embodiment, the coding scheme would comprise additional order-units in order to facilitate the communication of additional or more complicated messages. The codes for such additional order-units would be based on their expected frequency and would be generated from a tree created using, for example, the Huffman algorithm.

The plain text message ("buy400aaamarket") is then encoded using the coding scheme of Table 8 to yield a 49 bit message: [1100] [1101] [1111] [1000] [001] [001] [01] [01] [01] [000] [01] [1001] [1011] [1110] [1010] (the encoded message is shown with the encoded symbols separated by brackets and spaces; such brackets and spaces are solely for purposes of illustration, and would not be employed in the actual encoded message). The use of the methods of the present invention reduces the required message from 280 bits to 49 bits, a nearly 5-fold improvement in efficiency.

28

Example 3

Illustrative System and Methods for Clients Trading Baskets of Financial Interests In Example 2, the invention was illustrated with respect to a coding scheme based on symbol frequency (i.e., first-order entropy). To illustrate the invention with respect to word frequency (second-order entropy), a custom compression technique (such as the Huffman algorithm) is used to produce a coding scheme as in Example 2, except that entire words (as used herein the term "words" includes numbers) are treated as order-units. Thus, for the message "buy400aaamarket", the words "buy", "400", "aaa", and "market" are treated as individual order-units.

In order to establish a coding scheme capable of encoding all possible words (e.g., any stock, any amount of shares, etc.) the coding scheme will have many more codes that the scheme of Example 2. However, the total message length and average bit length of the second-order coding scheme are greatly reduced. As shown below in Table 9, since the message may be communicated with only a few codes, the binary values are extremely low, and the entire message can be sent in only 8 bits, a result that is 35-fold more efficient than the FIX protocol and more than 6-fold more efficient than the first-order entropy code of Example 2.

TABLE 9

| Coding Scheme | |
|---|---|
| Plain Text | Binary Value |
| buy | 00 |
| 400 | 01 |
| aaa | 10 |
| market | 11 |

Similarly, code schemes of higher-order entropy result in larger numbers of codes but even greater enhancement of efficiency.

Example 4

Illustrative System and Methods in Which Multiple Coding Schemes Are Employed

In each of Examples 2 and 3, a single coding scheme is employed. Alternatively, as shown in the present Example, multiple coding schemes may be employed. In one embodiment, different coding schemes are employed to effect transactions with different Brokers or with different Clients. Where multiple Clients interact with the same Broker, or where multiple Brokers interact with the same Client, permitting each Client (or Broker) to have a code optimized for the basket of orders handled by the Broker (or Client) increases the efficiency of Client-Broker data exchanges.

Alternatively, multiple coding schemes may be used in a single message by defining the message to have a protocol of ordered fields. Thus, for example, by establishing a protocol in which data is exchanged in a particular order (e.g., Field 1: Action (buy, sell, etc.); Field 2: Quantity; Field 3: Financial Interest (e.g., stock symbol); Field 4: Type (e.g., market, limit, etc.), the independent codes shown in Tables 8 or 9 may be replaced with non-independent codes. Thus, for example, if the message "buy400aaamarket", were established to conform to a protocol of Action|Quantity|Financial Interest|Type, then the codes used for "Action" could be reused for "Type", etc. To illustrate, four available Actions are: buy, sell, sell short, and buy to cover. Codes for these actions may thus be: 00, 01, 10, and 11. By establishing a field order protocol, these same codes (and not codes having larger numbers of bits) may be used to denote four "Types" of transactions: market, limit, stop limit order, and "market on close."

Example 5

Computer Hardware Considerations

In one example, high level (message order) entropy coding may involve the following codes: Action (buy, sell, sell short, buy to cover), Stock Symbol, Type (market or limit), Limit Price, Quantity, and Message Identifier. If one permits the numerical fields (Limit Price, Quantity and Message Identifier) to be represented by eleven symbols (0-9 and the decimal point), and for Stock Symbol to be any combination of 1-4 letters, then for four possible Actions, and two possible Types, the number of combinations is: $(4)(26^4)(2)((3(11^7))=2.13724 \times 1014$. This results in an approximate average code length of 48 bits per message=6 bytes per message.

Such a set of combinations would require approximately 24.29 terabytes of storage for the entire coding scheme. However, the majority of codes would have an expected p-value very close to 0% and therefore be unnecessary to store in a non-archival storage such as RAM or a high performance solid state drive. Instead, to reduce cost, the most frequent codes could be stored in high performance drives (and/or copied into RAM for even better performance) while the less frequent codes could be stored on less expensive traditional storage media such as a standard hard disk. Such high performance drives have a claimed read throughput of 250 MB/s and write throughput of 170 MB/s, with a latency of 65 microseconds. Finding a particular code using a binary search algorithm on a sorted list of codes would require at most: $\lg((24.29*(2^{40}))/48)*65=2,536.12633$ microseconds=2.5 milliseconds.

FIGS. 4A-4E illustrate computer networks capable of employing the methods of the present invention.

FIG. 4A illustrates a first embodiment of a computer system of the present invention. A first computer (Computer A; which may, for example be a first Client) is shown to be in digital communication with a second computer (Computer B; which may, for example, be a Broker), which in turn is in digital communication with a third computer (Computer C, which may, for example, be a Market Exchange Computer via communications that employ the methods of the present invention (dark shaded interconnecting pipeline). In one embodiment, Computer A and Computer B will possess copies of a first shared database (for example, a Client-Broker database), and Computer B and Computer C will possess copies of a second shared database (for example, a Broker-Market Exchange database, or a Gateway Computer of a Market Exchange-Matching Engine Computer of a Market Exchange). In such a network, financial orders of Computer A are sent to Computer B using a first coding scheme and then sent from Computer B to Computer C using a second coding scheme. This embodiment is desirable in situations in which Computer C is receiving financial orders from additional computers (e.g., Computer D) and does not wish to store and employ separate coding schemes (i.e., it employs a conventional means for data exchange (unshaded interconnecting pipeline)). Additionally, this embodiment permits additional computers (e.g., Computer D) to transmit orders to Computer B using a conventional protocol, and yet allow Computers B and C to transmit and process such orders using the more rapid methods provided by the present invention.

FIG. 4B illustrates a second embodiment of a computer system of the present invention. A first computer (Computer A; which may, for example, be a Client or Broker, Market Exchange, etc.) is shown to be in digital communication with a second computer (Computer B; which may, for example, be a Broker or the Gateway Computer of a Market Exchange) that in turn is in digital communication with a third computer (Computer C; which may, for example, be a Market Exchange or the Matching Engine Computer of a Market Exchange. In one embodiment, all three computers will possess copies of the same database (e.g., a Client-Broker-Market Exchange database). The shaded pipelines indicate that the digital communication employs the coding methods of the present invention.

Figure 4C:
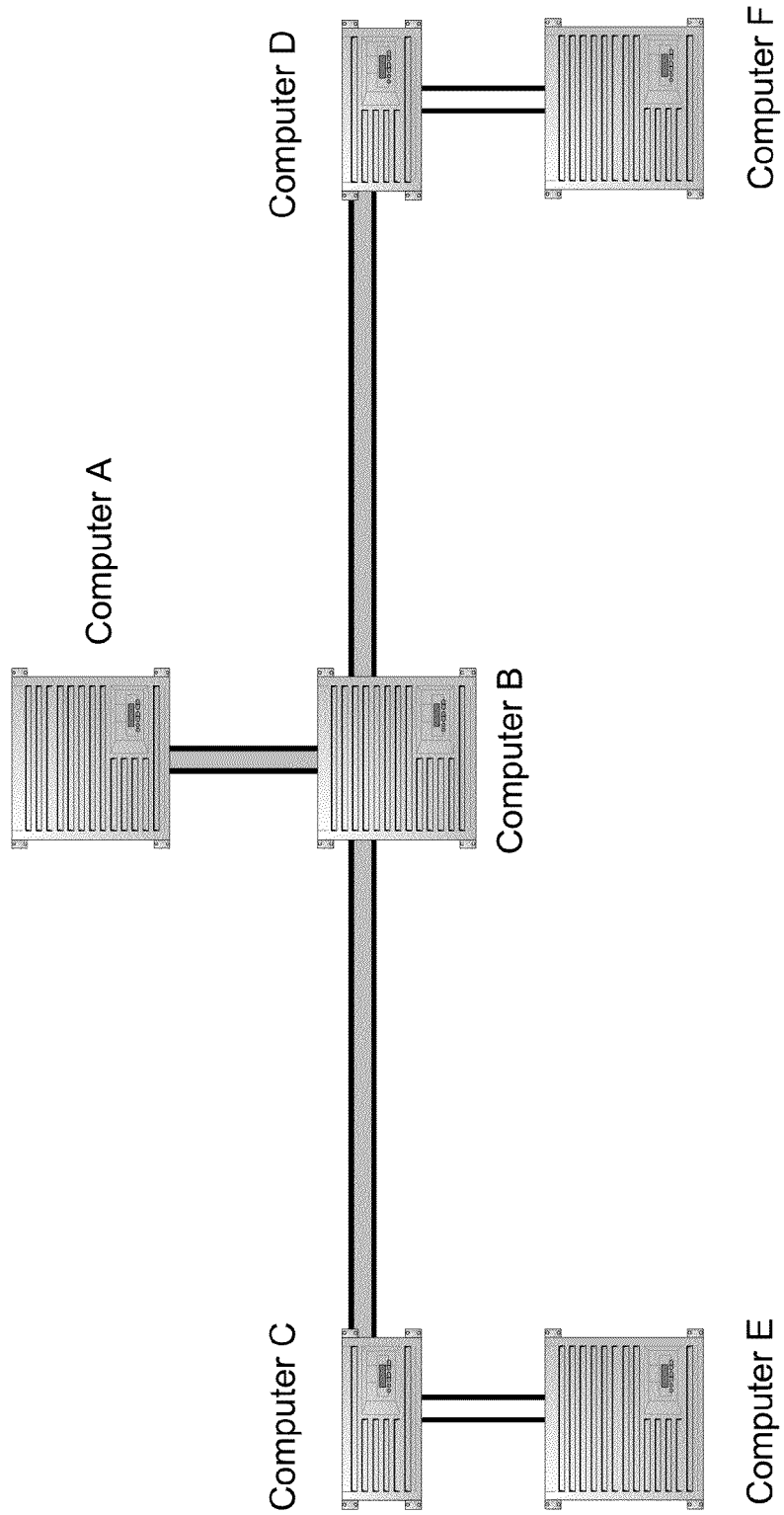

FIG. 4C illustrates a sub-embodiment of the above-described first embodiment of a computer system of the present invention. A first computer (Computer A, which may be, for example, a Client, Broker, or the Gateway Computer of a Broker) is shown to be in digital communication with a second computer (Computer B), which in turn is in digital communication with Computers C and D, using the coding methods of the present invention (shaded pipeline). Computer C is shown to be in conventional digital communication with Computer E (unshaded pipeline). Computer D is shown to be in conventional digital communication with Computer F (unshaded pipeline). In one embodiment, Computer A is a Client. Computer B may then be a Broker, or the Gateway Computer of a Broker in communication with the Broker's Risk Management System (Computer C). Computer E is the Market Exchange Computer. The Broker nodes are preferably located in close proximity to the Market Exchange(s), so that financial message transmission time is minimized. In one embodiment, a Client will transmit a financial message to a Broker using a conventional protocol (or using a Client-Broker database and the methods of the present invention). The Broker will then use the methods of the present invention to communicate such financial message to the Broker Node(s). The Broker Nodes will then decode the financial message into a protocol (such as FIX) that is recognized by the Market Exchange and communicate the financial message to the Market Exchange in the recognized protocol. This embodiment of the invention permits the methods of the invention to be employed even with Market Exchanges that do not possess or employ a Broker/Market Exchange database. Alternatively, Computer B may a Broker in communication with the Market Exchange's Gateway Computer (Computer C) that is in conventional digital communication with the Market Exchange's Matching Engine Computer. Computers E and F are similar to Computers C and E, respectively, and illustrate the ability of Clients and Brokers to employ the methods of the present invention to become in digital communication with multiple Market Exchanges or Multiple Brokers.

Figure 4D:
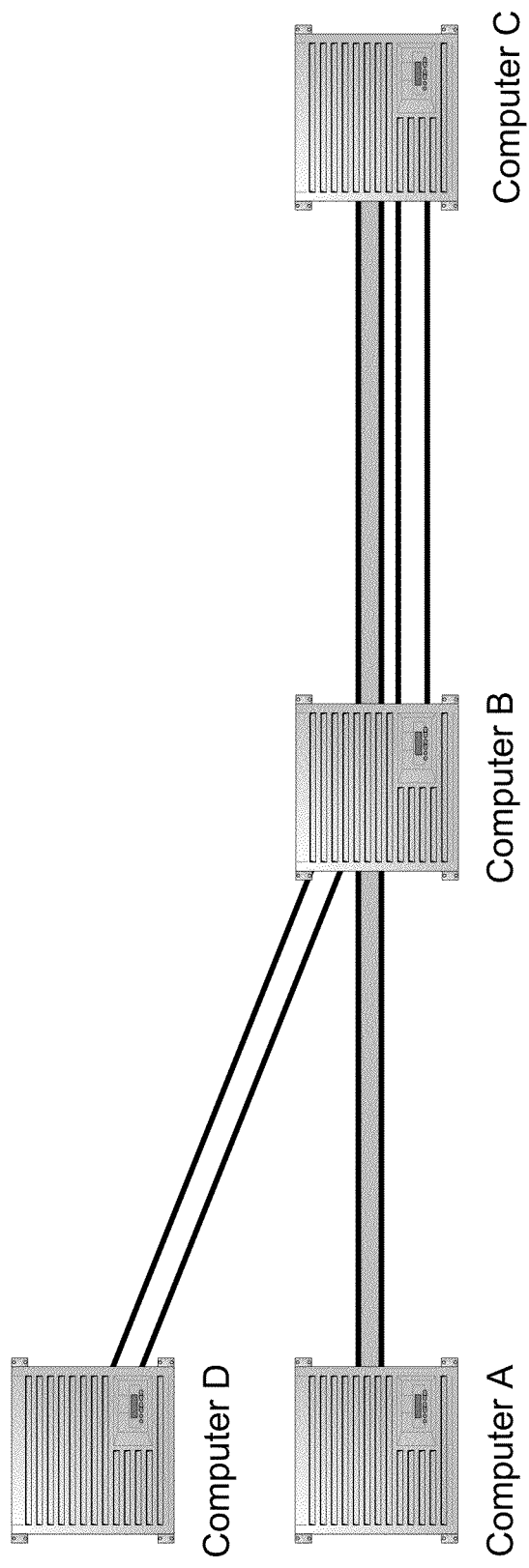

FIG. 4D illustrates a sub-embodiment of the above-described first embodiment of a computer system of the present invention. In the sub-embodiment, both a conventional digital communication link (such as FIX) (unshaded pipeline) and a digital communication link that employs the methods of the present invention (dark shaded pipeline) (and thus provides more rapid communication of financial messages). Financial messages are typically communicated using only the first connection. However, the existence of the second (and faster) connection permits Computer B to check, cancel, correct communicated financial messages, or perform risk management. Additionally, the existence of the second (and faster)

connection permits Computer B to offer two tiers of service to Clients (e.g., permitting Computer A to communicate with Computer C at higher speed and permitting Computer D to communicate with Computer C at conventional speed).

Figure 4E:
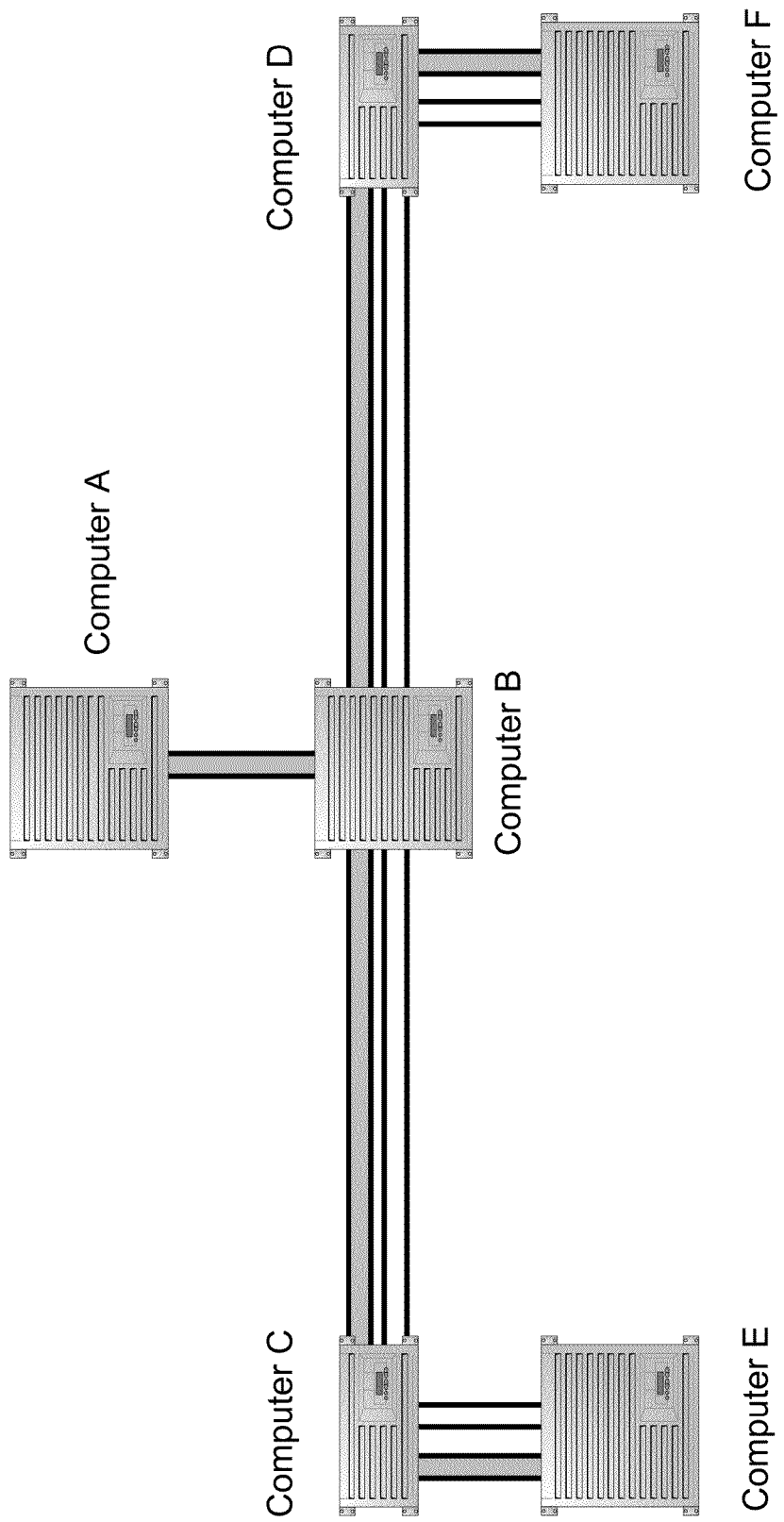

FIG. 4E illustrates a sub-embodiment of the above-described second embodiment in which Computers B, C, D, E, and F are in digital communication with each other through either (or both) a conventional digital communication link (unshaded pipeline) and a digital communication link (dark shaded pipeline) that employs the methods of the present invention (and thus provides more rapid communication of financial messages). In one embodiment, Computer A is a Client, Computer B is a Broker Computer, and Computers C and E (or Computers D and F) are, respectively, Market Exchange Gateway Computers and Market Exchange Matching Engine Computers, and a conventional digital communication link (unshaded pipeline) exists between Computers C and E (or between Computers D and F). This embodiment of the invention permits the checking or correction of communicated financial messages to be accomplished even with Market Exchanges that do not possess or employ a Broker/Market Exchange database. In an alternative embodiment, Computer A is a Client, Computer B is a Broker Computer, and Computers C and E (or Computers D and F) are, respectively, Market Exchange Gateway Computers and Market Exchange Matching Engine Computers, and a digital communication link (dark shaded pipeline) that employs the methods of the present invention (and thus provides more rapid communication of financial messages) exists between Computers C and E (or between Computers D and F). In this embodiment, the Market Exchange is able to employ the methods of the present invention to more rapidly transmit financial orders from its Gateway Computer to its Matching Engine Computer. Similarly, the methods of the present invention permit the processing of more financial orders per unit time, and thus increase the effective carrying capacity of the communication link between the Market Exchange's Gateway Computer and its Matching Engine Computer.

Example 6

Latency Considerations

A typical packet, including a packet header and message body, sent in FIX protocol averages approximately 350-400 bytes. An order execution report (sent, for example, by the Broker to the Client) typically averages approximately 425-475 bytes when sent according to the FIX protocol. A fill execution report (sent, for example, by the Market Exchange to the Broker) typically averages approximately 400-450 bytes when sent according to the FIX protocol. A heartbeat (a message advising that a connection is active) typically averages approximately 125-175 bytes when sent according to the FIX protocol.

At present, a typical T1 leased line connecting a Client to a Broker has a bandwidth of 1.544 megabits/second in each direction (upload and download).

Although Example 1 (Tables 1-3) demonstrates that the basket of hypothetical 31 trades required 4,963 bits if sent via the FIX protocol. In practice, however, FIX requires that each financial message be accompanied by a data header (typically including, for example, account information, time and date stamps, etc.), which greatly increases the amount of data per message. For this reason, in actual practice, each financial message sent via FIX typically requires 350-400 bytes to complete. Taking an average of 375 bytes (3,000 bits), the basket of financial messages will be expected to require 93,000 bits to complete. As shown in Example 1, the methods of the present invention permit financial messages to be communicated using far fewer bits, and such methods may be used to communicate header information, if such is desired. The methods of the present invention do not require such headers to be sent with each financial message.

The Total Latency experienced by a data exchange network is the sum for all hops of the Transmission Latency and the Processing Time. The Transmission Latency for each hop equals the Network Serialization Latency plus the Network Propagation Latency. The Network Serialization Latency is the message size (in bits) divided by the Connection Bandwidth (in bits per second). The Network Propagation Latency is the connection distance divided by the product of the speed of light and the efficiency of the connection medium. The Processing Time is the time required by a computer to process the data (for example, to search the database, move the data from RAM to CPU, etc.).

Because the methods of the present invention achieve substantial reductions in message size, Network Serialization Latency is decreased relative to alternatives such as the FIX Protocol. This reduced message size results in an improved (lower) latency compared to such alternatives.

All publications and patents mentioned in this specification are herein incorporated by reference to the same extent as if each individual publication or patent application was specifically and individually indicated to be incorporated by reference in its entirety. While the invention has been described in connection with specific embodiments thereof, it will be understood that it is capable of further modifications and this application is intended to cover all variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A computer-implemented method for enhancing the efficiency of digitally communicating a financial message from a first computer to a second computer of an interconnected computer system, which method comprises the steps:

(A) (1) employing said first computer to generate a data compression coding scheme based on order-units present in an unencoded version of said financial message;

(2) employing said computer-generated coding scheme to produce a database of order-units present in said unencoded version of said financial message; and (3) employing said produced database to form an encoded version of said financial message;

wherein said data compression technique is customized so that said computer-generated coding scheme allocates shorter codes to order-units having a higher p-value in said unencoded financial message and longer codes to order-units having a lower p-value present in said unencoded version of said financial message;

wherein said p-value is a metric of the moving average of the frequency of said order-unit, weighted by its assigned importance, relative to other order-units in said message(s), such that an order-unit having a higher importance-weighted frequency is assigned a higher p-value than an order-unit having a lesser importance-weighted frequency; and wherein the message length of said encoded version of said financial message is shorter than the message length of said unencoded version of said financial message; and (B) digitally communicating said encoded version of said financial message from said first computer to said second computer, directly or via one or more intermediate computers.

2. A computer-implemented method for enhancing the efficiency of digitally communicating a financial message from a first computer to a second computer of an interconnected computer system, which method comprises the steps:

(A) (1) employing said first computer to generate a data compression coding scheme based on order-units present in an unencoded version of said financial message; and (2) employing said computer-generated coding scheme to produce a database of order-units present in said unencoded version of said financial message; and (3) employing said produced database to form an encoded version of said financial message;

wherein said data compression technique is adaptive to permit said computer-generated coding scheme to adjust over time to allocate shorter codes to order-units having a higher p-value in said unencoded financial message and longer codes to order-units having a lower p-value for order-units present in both said unencoded version of said financial message and in at least one previously communicated financial message;

wherein said p-value is a metric of the moving average of the frequency of said order-unit, weighted by its assigned importance, relative to other order-units in said message(s), such that an order-unit having a higher importance-weighted frequency is assigned a higher p-value than an order-unit having a lesser importance-weighted frequency; and wherein the message length of said encoded version of said financial message is shorter than the message length of said unencoded version of said financial message; and (B) digitally communicating said encoded version of said financial message from said first computer to said second computer, directly or via one or more intermediate computers.

3. The computer-implemented method of any one of claims 1-2, wherein said data compression technique additionally employs massively parallel processing.

4. The computer-implemented method of any one of claims 1-2, wherein said data compression technique additionally employs a database optimization technique.

5. The computer-implemented method of any one of claims 1-2, wherein said data compression technique additionally employs a calculation optimization technique.

6. The computer-implemented method of any one of claims 1-2, wherein said data compression technique encodes said financial message into an encoded version having at least 80% efficiency.

7. The computer-implemented method of any one of claims 1-2, wherein said data compression technique encodes said financial message into an encoded version having at least 90% efficiency.

8. The computer-implemented method of any one of claims 1-2, wherein said data compression technique encodes said financial message into a message that is at least 50% shorter than a message communicating said unencoded financial message.

9. The computer-implemented method of any one of claims 1-2, wherein said data compression technique encodes said financial message into a message that is at least 5-fold shorter than a message communicating said unencoded financial message.

10. The computer-implemented method of any one of claims 1-2, wherein said data compression technique employs an Arithmetic Algorithm or a Huffman Algorithm.

11. The computer-implemented method of any of claims 1-2, wherein said financial message is an offer for purchase or sale of a financial interest.

12. The computer-implemented method of any of claims 1-2, wherein said method additionally comprises the step:

(C) fulfilling said financial message, wherein said financial message comprises a request for information relating to a financial interest.

13. The computer-implemented method of claim 12, wherein said request for information relating to a financial interest comprises a request for information relating to the value of the financial interest, a request for information relating to news concerning the financial interest, or an agreement to purchase or sell a financial interest, or a confirmation thereof.

14. A computer system, comprising a first and a second computer, in digital communication with one another, wherein said computer system is specially adapted for enhancing the efficiency of digitally communicating a financial message, and wherein:

(A) said first computer employs a data compression technique to establish a coding scheme and employs said coding scheme to produce an encoded version of the financial message based on order-units present in an unencoded version of said financial message;

(1) wherein said data compression technique is customized so that said coding scheme allocates shorter codes to order-units having a higher p-value in said unencoded financial message and longer codes to order-units having a lower p-value present in said unencoded financial message;

(2) wherein said p-value is a metric of the moving average of the frequency of said order-unit, weighted by its assigned importance, relative to other order-units in said message(s), such that an order-unit having a higher importance-weighted frequency is assigned a higher p-value than an order-unit having a lesser importance-weighted frequency;

wherein the message length of said encoded version of said financial message is shorter than the message length of the unencoded version of said financial message;

and (B) said second computer contains a stored copy of said database and, upon receiving said encoded version of the financial message, employs said stored database to decode said encoded version of the financial message.

15. A computer system, comprising a first and a second computer, in digital communication with one another, wherein said computer system is specially adapted for enhancing the efficiency of digitally communicating a financial message, and wherein:

(A) said first computer employs a data compression technique to establish a coding scheme and employs said coding scheme to produce an encoded version of the financial message based on order-units present in an unencoded version of said financial message;

(1) wherein said data compression technique is adaptive to permit said coding scheme to adjust over time to allocate shorter codes to order-units having a higher p-value in said unencoded financial message and longer codes to order-units having a lower p-value for order-units present in both said unencoded financial message and in at least one previously communicated financial message;

(2) wherein said p-value is a metric of the moving average of the frequency of said order-unit, weighted by its assigned importance, relative to other order-units in said message(s), such that an order-unit having a higher importance-weighted frequency is assigned a higher p-value than an order-unit having a lesser importance-weighted frequency;

wherein the message length of said encoded version of said financial message is shorter than the message length of the unencoded version of said financial message;

and (B) said second computer contains a stored copy of said database and, upon receiving said encoded version of the financial message, employs said stored database to decode said encoded version of the financial message.

\* \* \* \* \*